United States Patent [19]
Inagaki et al.

[11] Patent Number: 5,890,789
[45] Date of Patent: Apr. 6, 1999

[54] MULTI-BEAM EMITTING DEVICE HAVING AN ACOUSTOOPTIC ELEMENT

[75] Inventors: Yoshihiro Inagaki; Toshio Naiki; Akiyoshi Hamada; Keiji Ogoh, all of Toyokawa, Japan

[73] Assignee: Minolta Co., Ltd., Osaka, Japan

[21] Appl. No.: 972,803

[22] Filed: Nov. 18, 1997

[30] Foreign Application Priority Data

Nov. 18, 1996 [JP] Japan .................................... 8-306412
Nov. 18, 1996 [JP] Japan .................................... 8-306413
Nov. 18, 1996 [JP] Japan .................................... 8-306414

[51] Int. Cl.$^6$ .................................................. G02F 1/33
[52] U.S. Cl. .......................... 359/305; 359/310; 359/285; 359/204; 385/7
[58] Field of Search .................... 359/204, 305, 359/310, 311, 312, 285, 287, 216; 385/7; 250/585, 578.1

[56] References Cited

U.S. PATENT DOCUMENTS

| | | | |
|---|---|---|---|
| 4,094,583 | 6/1978 | Kondo et al. | 359/305 |
| 4,206,347 | 6/1980 | Avicola et al. | 359/285 |
| 4,453,160 | 6/1984 | McNaney | 359/310 |
| 4,961,632 | 10/1990 | Hatori et al. | 359/305 |
| 5,132,834 | 7/1992 | Shinada | 359/285 |
| 5,311,321 | 5/1994 | Crowley | 359/285 |
| 5,689,362 | 11/1997 | Kadota | 359/305 |

FOREIGN PATENT DOCUMENTS

| | | |
|---|---|---|
| 54-083454 | 7/1979 | Japan . |
| 54-086360 | 7/1979 | Japan . |
| 54-85744 | 7/1979 | Japan . |
| 59-42855 | 10/1984 | Japan . |
| 61-24691 | 6/1986 | Japan . |

OTHER PUBLICATIONS

Hatori et al, "Waveguide–Type Multifrequency A O Modulators," Sep. 1992, Technical Report of The Institute of Electronics, Information and Communication Engineers, US92–51.

*Primary Examiner*—Loha Ben
*Attorney, Agent, or Firm*—Sidley & Austin

[57] ABSTRACT

A multi-beam emitting device which splits a light beam emitted from a light source into a plurality of beams with a beam splitter to emit a plurality of beams. As the beam splitter, an optical waveguide type acoustooptic element or the like is used. A multi-beam emitting device according to the present invention has a beam splitter which drives an acoustooptic element with a plurality of electric signals with different frequencies applied thereto so as to deflect a light beam emitted from a light source and split the light beam into a plurality of beams, a signal generator which generates the electric signals with different frequencies which are used for the drive of the acoustooptic element, a modulating circuit which turns on and off the electric signals generated by the signal generator individually based on a data signal, an intensity control circuit which controls the light source to change the intensity of the light beam emitted therefrom. Another multi-beam emitting device has a beam splitter which deflects a light beam emitted from a light source and splits the light beam into an even number of beams, a shutting member which shuts out a half of the beams, a modulating circuit which controls the beam splitter so that the total quantity of light of the beams which are emergent from the beam splitter and not shut out by the shutting member and the beams which are emergent from the beam splitter and shut out by the shutting member will be constant. Further, in these multi-beam emitting devices, the deflecting position of the light beam and the beam waist position of the light beam are inside the optical waveguide type acoustooptic element at a specified distance from each other.

19 Claims, 17 Drawing Sheets

F I G. 2 0
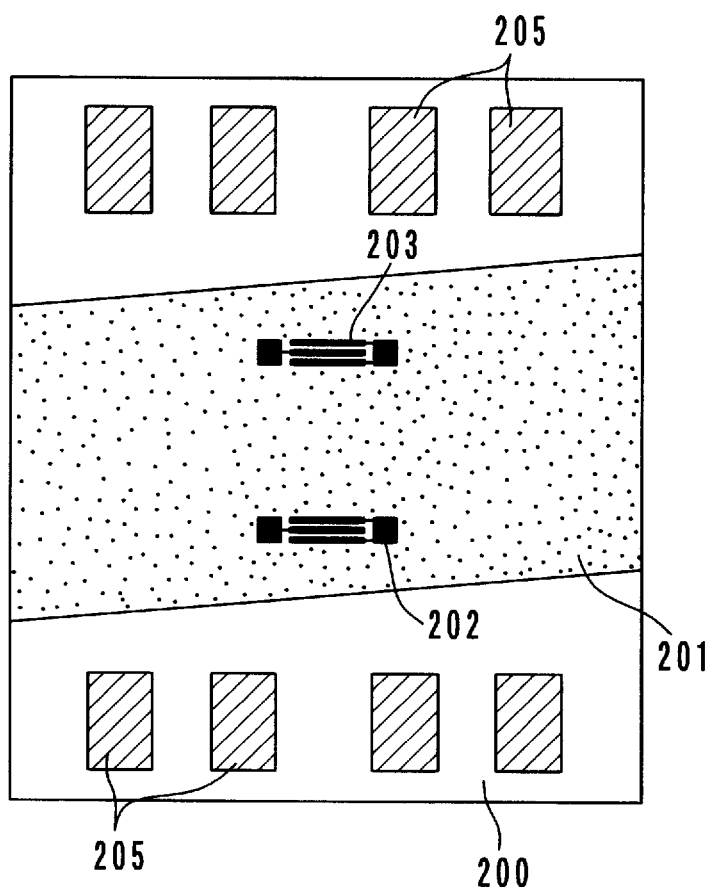

MULTI-BEAM EMITTING DEVICE HAVING AN ACOUSTOOPTIC ELEMENT

BACKGROUND OF THE INVENTION

1. Field of the Invention

The preset invention relates to a multi-beam emitting device, and more particularly to a multi-beam emitting device which is suited to be employed in an optical switch and an optical modulator of an optical computer, an optical switch, an optical branching filter and an optical modulator of an optical communicating apparatus and an optical deflector and an optical modulator of a laser printer, a copying machine a scanner, etc.

2. Description of Related Art

A multi-beam emitting device which deflects a laser beam with a specified intensity which has been emitted from a laser source with an acoustooptic element which is driven with a plurality of electric signals with different frequencies applied thereto to split the laser beam into a plurality of laser beams has been conventionally known. When such a multi-beam emitting device is employed in an optical switch or an optical modulator of an optical computer, an optical switch or an optical branching filter of an optical communicating apparatus or the like, synchronization of a plurality of signals and simultaneous processes of a plurality of signals become possible, which is very advantageous, although the device is of a simple structure. Also, when such a multi-beam emitting device is employed in an image forming system of an electrophotographic copying machine or a laser printer, simultaneous exposure of a plurality of scanning lines becomes possible by supplying a plurality of drive signals with different frequencies, and multi-gradation image-forming becomes possible by controlling the amplitudes of the drive signals to vary the intensities (quantities of light) of the plurality of beams.

However, there have been some problems in such a conventional multi-beam emitting device having an acoustooptic element. The first problem is that the intensities of diffracted beams vary according to the number of beams to be emitted from the device, that is, that a scramble for power among beams occurs.

As a countermeasure against this problem, for example, as disclosed by Japanese Patent Laid Open Publication No. 54-83454, it has been known that a laser source 251, a waveguide type acoustooptic element 252, a signal generator 253, an amplitude control circuit 254, an image data processor 255 and a modulating circuit 256 are provided to such a multi-beam emitting device (see FIG. 21). In this device, a correction signal which depends on the number of beams to be emitted from the device is transmitted from the modulating circuit 256 to the amplitude control circuit 254, where the amplitudes of electric signals with frequencies $f_1$, $f_2$ and $f_3$, respectively, generated by the signal generator 253 are controlled based on the correction signal so that the intensities of output beam $L_1$, output beam $L_2$, and output beam $L_3$ can be kept constant regardless of the number of emitted beams.

As disclosed by Japanese Patent Laid Open Publication No. 54-85744, it has been also known that a laser source 261, an acoustooptic element 262, a signal generator 263, an image data processor 264, a modulating circuit 265, a photosensor 266, an intensity control circuit 267 and a make-up beam source 268 are provided to such a multi-beam emitting device (see FIG. 22). In this device, the intensity of a non-diffracted beam emergent from the acoustooptic element 262 is detected by the photosensor 266, and a detection signal of the photosensor 266 is transmitted to the intensity control circuit 267. In the intensity control circuit 267, the intensity of the non-diffracted beam is kept constant by controlling the intensity of a make-up laser beam emitted from the make-up beam source 268 so that the intensities of output beam $L_1$, output beam $L_2$ and output beam $L_3$ can be kept constant regardless of the number of emitted beams.

Further, as disclosed by Japanese Patent Laid Open Publication No. 54-86360, a laser source 271, an acoustooptic element 272, a signal generator 273, an image data processor 274, a modulating circuit 275, an arithmetic circuit 276, an intensity control circuit 277 and a make-up beam source 278 are provided to such a multi-beam emitting device (see FIG. 23). In this device, data about the number of beams to be emitted from the device are transmitted from the modulating circuit 275 to the arithmetic circuit 276, and a result of calculation performed in the arithmetic circuit 276 based on the data is transmitted to the intensity control circuit 277 as a correction signal. In the intensity control circuit 277, the intensity of a make-up laser beam emitted from the make-up beam source 278 is controlled based on the correction signal so that the intensities of output beam $L_1$, output beam $L_2$ and output beam $L_3$ can be kept constant regardless of the number of emitted beams.

In the multi-beam emitting device shown in FIG. 21, it is intended to alter the modulation efficiencies of the electric signals by controlling the amplitudes of the electric signals; however, there is a problem that the amplitudes and the modulation efficiencies of the electric signals do not change linearly. Further, the following problems are likely to occur: the electric signals are distorted during the amplitude control; and an unnecessary signal such as a high-frequency signal occurs during the amplitude control, thereby causing unnecessary diffracted beam by Bragg diffraction.

In the multi-beam emitting devices shown by FIGS. 22 and 23, there may be a problem that the wavelength of the make-up beam emitted from the make-up beam source 268 or 278 is not equal to the wavelength of the input laser beam emitted from the laser source 261 or 271, which causes a difference between the Bragg angle of the input laser beam and that of the make-up beam, resulting in a focal shift.

When such a multi-beam emitting device is used as an optical deflector which is employed in an image forming system of an electrophotographic copying machine or a laser printer, if a scramble for power among beams occurs, the picture quality will deteriorate. In order to prevent the scramble for power, Japanese Patent Publication No. 61-24691 has suggested that the intensities of non-diffracted light beam and regular diffracted light beam to be used for image writing are detected and that the intensity of dummy light beam is controlled so that the intensities of the non-diffracted light beam and the regular diffracted light beam can be kept constant at respective specified values.

However, according to the control method, a sensor for detecting the light intensity is necessary. Moreover, the control of the light intensity is necessary even for formation of a two-value image, and much more complicated control of the light intensity is necessary for formation of a multi-gradation image.

When such a multi-beam emitting device is used as an optical deflector which is employed in an image forming system of an electrophotographic copying machine or a laser printer, there is further another problem described below as well as the problem of a scramble for power.

An example of well-known multi-beam emitting devices is one described in Technical Report of IEICE US 92-51

(1992-09). This multi-beam emitting device is to split a laser beam into a plurality of beams with an optical waveguide type acoustooptic element which is driven with a plurality of electric signals with different frequencies applied thereto. In this device, the position of the beam waist of the laser beam is coincident with the deflecting position of the optical waveguide type acoustooptic element.

Also, Japanese Patent Publication No. 59-42855 suggested an apparatus which divides a laser beam into a plurality of beams with a crystal type acoustooptic element which is driven with a plurality of electric signals with different frequencies applied thereto and carries out simultaneous exposure of a plurality of scanning lines. In this apparatus, the deflecting position and the beam waist of the laser beam which is closer to the deflecting position are set at a specified distance from each other for the purpose of regulating the intervals among scanning lines. Meanwhile, because crystal is costly, the dimensions of the crystal type acoustooptic element are only several millimeters. Accordingly, when the deflecting position is inside the acoustooptic element, the beam waist which is closer to the deflecting position is outside the acoustooptic element.

If the multi-beam emitting device described in Technical Report of IEICE US 92-51 (1992-09) is used as a multi-beam source in a laser beam scanning optical apparatus, the following problem occurs because of the coincidence of the beam waist position and the deflecting position of the acoustooptic element with each other. When a scanning lens system is imparted with a function of correcting errors of perpendicularity of reflective facets of a polygon mirror, a plurality of beams which have been split from a laser beam by the optical waveguide type acoustooptic element are converged on a point on a scanning surface through the scanning lens system, and the intervals among scanning lines cannot be regulated.

On the other hand, with regard to the apparatus disclosed by Japanese Patent Publication No. 59-42855, because the deflecting position and the beam waist position are at a distance from each other, the apparatus does not have the problem that a plurality of beams which have been split from a laser beam by the crystal type acoustooptic element are converged on a point on a scanning surface. However, because the beam waist is positioned outside the crystal acoustooptic element, there are problems described below.

(1) When the positional relationships among the acoustooptic element and other optical elements change because of a change in environments (temperature), aging or the like, the positional relationship between the deflecting position and the beam waist changes. Thus, the intervals among scanning lines cannot be kept constant.

(2) When an error in driving the acoustooptic element occurs because of a change in environments, fluctuation of the electric power or the like, the angles of the beams emergent from the acoutooptic element, which has a high refractive index, to the air fluctuate, and the amount of fluctuation is magnified on the scanning surface in a direction in which the beams are aligned (sub scanning direction). Accordingly, because the beam waists are likely to shift in the direction, it is difficult to make uniform intervals among scanning lines.

(3) When the beam waist of the laser beam is positioned downstream from the deflecting position, the laser beams are emergent from the acoustooptic element at different angles, and accordingly, the emergent beams have mutually different astigmatic differences. Because of the differences in astigmatic difference among the laser beams, viewed from the optical system downward from the acoustooptic element, the positions of the light sources shift from desired positions by mutually different distances. Consequently, scanning lines on a scanning surface are uneven. When the beam waist is positioned upstream from the deflecting position, the beams emergent from the acoustooptic element have mutually equal astigmatic differences, and correction of these astigmatic differences is possible. However, an optical surface must be provided additionally for the correction; for example, the acoustooptic element itself (dielectric crystal) must be processed to have the astigmatic difference correction function, or a cylindrical lens or a prism must be provided additionally.

SUMMARY OF THE INVENTION

It is an object of the present invention is to provide a multi-beam emitting device which emits a plurality of beams each of which has a constant intensity at all times regardless of the number of beams to be emitted from the device, which changes according to image data.

It is another object of the present invention is to provide a multi-beam emitting device wherein a scramble for power among beams can be prevented without carrying out an intensity modulation process.

Further, another object of the present invention is to provide a multi-beam emitting device which emits beams which have small astigmatic differences and are to be scanned on a scanning surface at uniform intervals although the deflecting position of an acoustooptic element and the beam waist which is closer to the deflecting position are set at a specified distance from each other.

In order to attain the objects above, a multi-beam emitting device according to the present invention comprises: a light source which emits a light beam; a beam splitter which drives an acoustooptic element with a plurality of electric signals with different frequencies applied thereto to deflect the light beam emitted from the light source and split the light beam into a plurality of beams; a signal generator which generates the electric signals with different frequencies which are used for the drive of the acoustooptic element; a modulating circuit which turns on and off the electric signals generated by the signal generator individually based on a data signal; and an intensity control circuit which controls the light source to emit a light beam with a varied intensity based on a control signal transmitted from the modulating circuit.

In the structure, when the number of beams into which the light beam is to be split (the number of beams to be emitted from the multi-beam emitting device) changes according to the data signal, the intensity control circuit controls the light source to emit a light beam with an intensity which is proportional to the number of beams. Thereby, a scramble for power among beams can be avoided, and fluctuation of the intensity of each beam can be prevented.

Another multi-beam emitting device according to the present invention comprises: a light source which emits a light beam; a beam splitter which deflects the light beam emitted from the light source and splits the light beam into an even number of beams; a shutting member which shuts out a half of the beams split from the light beam by the beam splitter; and a modulating circuit which controls the beam splitter so that the total quantity of light of the beams which are emergent from the beam splitter and not shut out by the shutting member and the beams which are emergent from the beam splitter and shut out by the shutting member will be constant.

For example, if the beam splitter splits the light beam emitted from the light source into six beams, the shutting member shuts out three beams, and the other three beams are used for image writing. When a two-value image is to be formed, the three beams for image formation are turned on and off individually in accordance with image signals. Then, for example, when one of the three beams for image formation is on, two of the three beams to be shut out are turned on. When two of the three beams for image formation are on, one of the three beams to be shut out is turned on. In this way, in the beam splitter, three beams are turned on at all times, that is, the total of the number of beams which are emergent from the beam splitter to be used for image formation and the number of beams which are emergent from the beam splitter to be shut out by the shutting member is constant. With this arrangement, it is no longer necessary to monitor the intensities of beams and feedback the results for modulation in order to prevent a scramble for power, and consequently, quality images can be formed.

Further, another multi-beam emitting device according to the present invention comprises: a light source which emits a light beam; and an optical waveguide type acoustooptic element which deflects the light beam emitted from the light source and splits the light beam into a plurality of beams. In the multi-beam emitting device, a deflecting position of the light beam and a beam waist position of the light beam are inside the optical waveguide type acoustooptic element at a specified distance from each other.

In the structure, there is only a small difference in refractive index between the beam waist position and the deflecting position, which are both inside the optical waveguide of the optical waveguide type acoustooptic element, compared with a conventional multi-beam emitting device wherein the deflecting position and the beam waist position are inside the crystal body of the acoustooptic element and outside the crystal body (in the air), respectively. Accordingly, the beams made by the deflection at the deflecting position have small mutual differences in characteristics.

BRIEF DESCRIPTION OF THE DRAWINGS

These and other objects and features of the present invention will be apparent from the following description with reference to the accompanying drawings, in which:

FIG. 20 is a plan view of an optical waveguide type acoustooptic element which is to be employed in a practical multi-beam emitting device according to the present invention;

DETAILED DESCRIPTION OF THE PREFERRED EMBODIMENTS

Preferred embodiments of the present invention are hereinafter described with reference to the accompanying drawings.

First Embodiment

Figure 1:
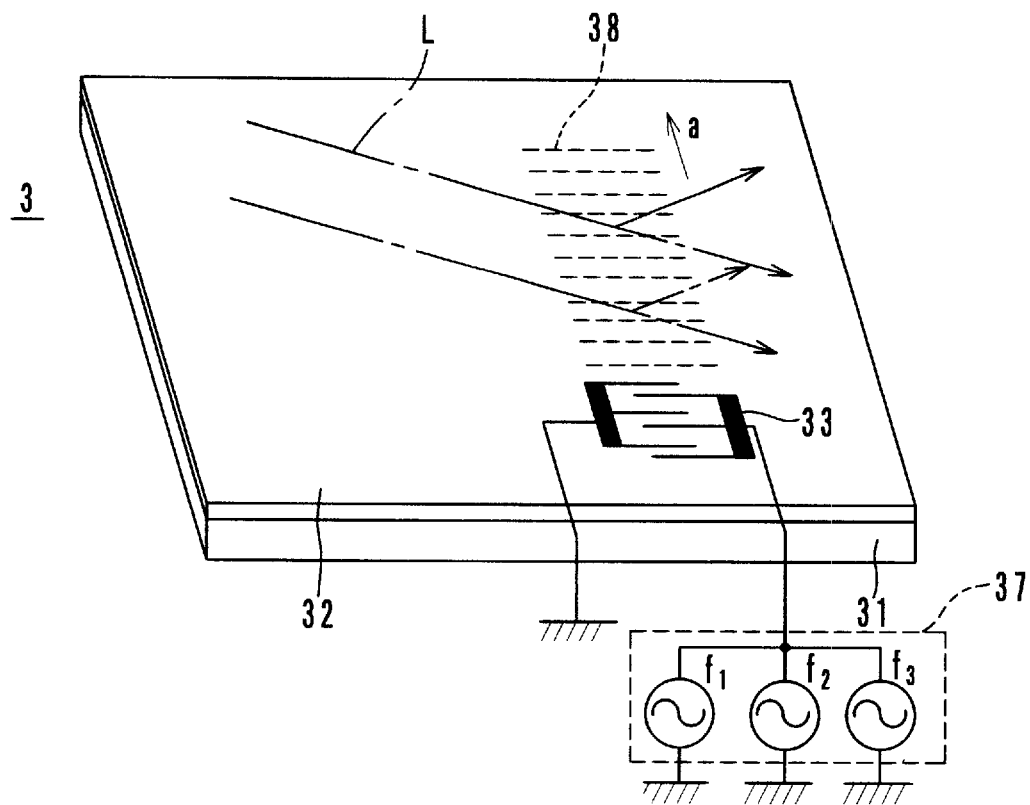
FIG. 1 is a perspective view of an optical waveguide type acoustooptic element which is employed in a multi-beam emitting device which is a first embodiment of the present invention.
Figure 2:
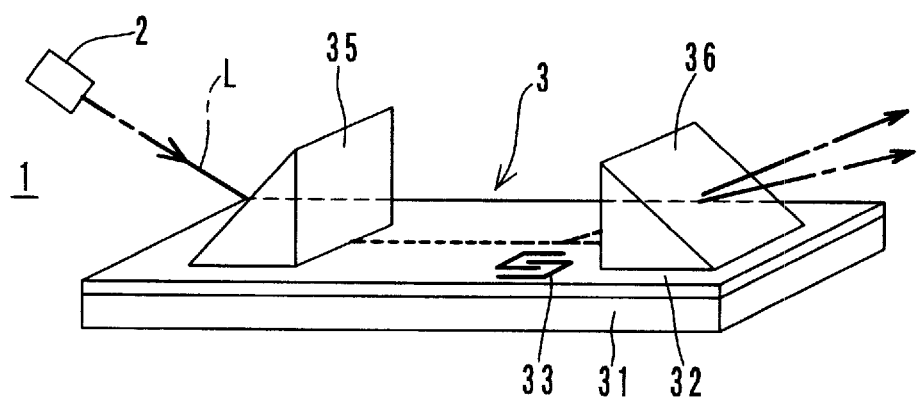
FIG. 2 is another perspective view of the optical waveguide type acoustooptic element of FIG. 1.

FIGS. 1 and 2 show an optical waveguide type acoustooptic element 3 which is to be used in a multi-beam emitting device. As is apparent from FIGS. 1 and 2, the optical waveguide type acoustooptic element 3 is of a laminate structure composed of a substrate 31 and an optical waveguide 32. The substrate 31 is a plate of crystal such as sapphire or a thin plate of silicon, glass or the like. Because the substrate 31 is a thin plate, it is less costly than a rectangular crystal body of a crystal type acoustooptic element.

The optical waveguide 32 is formed on the substrate 31 by a laser ablation method, a sputtering method, a vacuum evaporation method, a CVD method, a sol-gel method, an ion exchanging method, a proton exchanging method or the like. In order for an efficient acoustooptic interaction, it is preferred to use a material which is good in piezoelectricity and hardly makes a laser beam emitted from a laser diode 2 attenuate is used as the optical waveguide 32. Specifically, ZnO, $LiNbO_3$, $PbMoO_4$, $TeO_2$, $As_2O_3$, GaAs, etc. can be used.

On the optical waveguide 32, in the right front part of the center, an interdigital transducer 33 which is an ultrasonic oscillator is formed by a photolithographic method, a lift-off method, an etching method, an electron beam scanning method or the like. A large angle of Bragg diffraction (which will be described later) and/or a wide variation in angle of Bragg diffraction can be attained by designing the intervals and the widths of fingers of the interdigital transducer 33 to suitable values. Further, on the optical waveguide 32, an incidence prism 35 and an emergence prism 36 are provided in the left side and the right side, respectively. The incidence prism 35 is to make a laser beam L emitted from the laser diode 2 couple to the optical waveguide 32. The emergence prism 36 is to make the laser beam L traveling in the optical waveguide 32 emergent therefrom.

The interdigital transducer 33 excites surface acoustic waves 38 on the optical waveguide 32 when it is supplied with a high-frequency electric signal from a high-frequency signal generator 37. As the high-frequency signal generator 37, for example, a VCO (voltage control oscillator) is used. The surface acoustic waves 38 are propagated on the optical waveguide 32 in a direction of arrow "a" in FIG. 1.

Meanwhile, the laser beam L emitted from the laser diode 2 is coupled to the optical waveguide 32 via the incidence prism 35 and travels in the optical waveguide 32. The surface acoustic waves 38 cause the refractive index of the optical waveguide 32 to alter periodically, which functions as a diffraction grating of the laser beam L. Accordingly, when the laser beam L crosses the surface acoustic waves 38, an acoustooptic interaction between the laser beam L and the surface acoustic waves 38 (Bragg diffraction) occurs, resulting in deflection of the laser beam L as shown in FIG. 1.

The angle of Bragg diffraction of the laser beam L depends on the frequency of the surface acoustic waves 38, which depends on the frequency of the high-frequency signal applied to the transducer 33. Therefore, when electric signals with different frequencies are applied to the transducer 33 from the high-frequency electric signal generator 37 (multi-frequency drive), surface acoustic waves 38 with a plurality of different frequencies are excited. In this case, the laser beam L is diffracted and deflected at a plurality of angles and is split into a plurality of laser beams as shown in FIG. 2. The plurality of laser beams are emergent from the optical waveguide 32 via the emergence prism 36.

Figure 3:
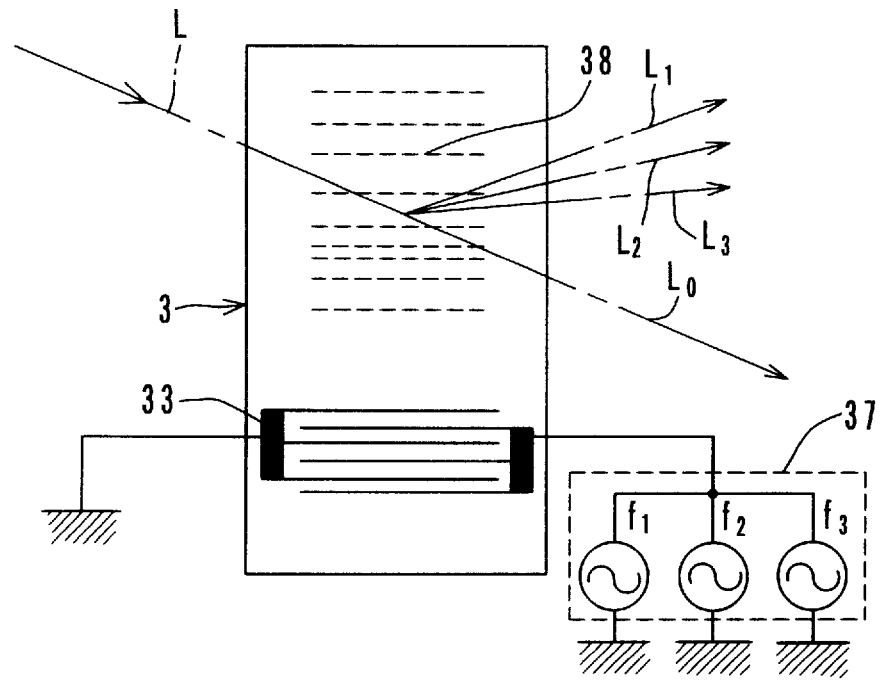
FIG. 3 is a plane view of the optical waveguide type acoustooptic element of FIG. 1, showing multi-frequency drive of the acoustooptic element.

In the first embodiment, as FIG. 3 shows, three high-frequency electric signals with frequencies $f_1$, $f_2$ and $f_3$, respectively, are applied to the transducer 33 from the high-frequency electric signal generator 37, and three output beams $L_1$, $L_2$ and $L_3$ are obtained.

Next, a multi-beam emitting device 1 provided with this waveguide type acoustooptic element 3 is described.

Figure 4:
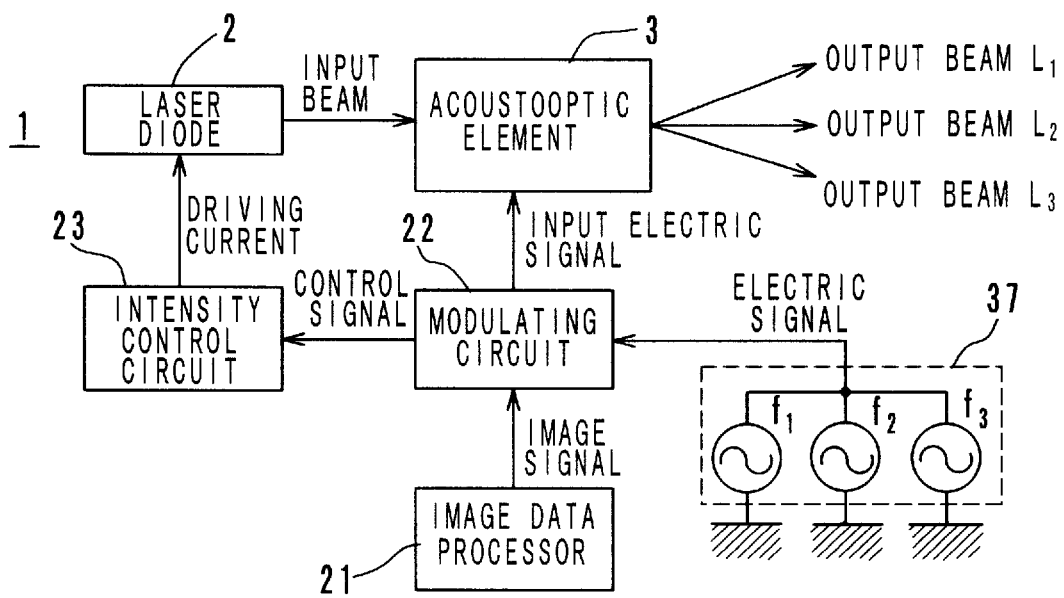
FIG. 4 is a block diagram of the multi-beam emitting device of the first embodiment.

As shown in FIG. 4, the multi-beam emitting device 1 comprises the laser diode 2, the optical waveguide type acoustooptic element 3, an image data processor 21, a modulating circuit 22, an intensity control circuit 23 and the high-frequency electric signal generator 37. The image data processor 21 receives image data from a bit map memory of a printer and produces image signals which indicate which of the output beams $L_1$, through $L_3$ are to be turned on based on the image data. The image signals are sent to the modulating circuit 22. The modulating circuit 22 selects one or more from the three high-frequency signals with frequencies $f_1$, $f_2$ and $f_3$ based on the image signals as the ones to be turned on and in this way, produces an input electric signal to be inputted to the acoustooptic element 3. Further, the modulating circuit 22 determines the number of beams into which the laser beam is to be split (the number of beams to be emitted from the device 1) based on the number of selected output beams and produces a control signal. The intensity control circuit 23 is to change the driving current of the laser diode 2.

In this multi-beam emitting device 1, three high-frequency electric signals with frequencies $f_1$, $f_2$ and $f_3$, respectively, which are generated by the high-frequency electric signal generator 37, are sent to the modulating circuit 22. In the modulating circuit 22, the three electric signals with frequencies $f_1$ through $f_3$ are modulated (are turned on and off) individually based on the image signals sent from the image signal processor 21, and also, the number of beams to be emitted from the device 1 is determined. Then, the control signal indicating the number of beams is sent to the intensity control circuit 23. In the intensity control circuit 23, the driving current of the laser diode 2 is changed based on the control signal sent from the modulating circuit 22. At this time, the driving current of the laser diode 2 is so controlled that the laser beam L emitted from the laser source 2 will have an intensity which is proportional to the number of turned-on output beams (the number of beams to be emitted from the device 1). With this control, there is no possibility of distortion of the electric signals and of occurrences of unnecessary high-frequency signals. Further, because a make-up beam is not used, the difference in angle of Bragg diffraction between the input beam (laser beam L) and the make-up beam due to the difference in wavelength between these beams needs to be no longer considered.

Thus, although the multi-beam emitting device 1 is of a simple structure which is merely provided with an intensity control circuit for controlling the intensity of the laser beam emitted from the laser source, when the number of beams emitted from the device 1 changes, a scramble for power does not occur, and the intensity of each output beam can be kept constant.

Table 1 shows the control of the driving current of the laser diode 2 specifically. When one output beam is to be turned on, that is, when the number of beams to be emitted from the device 1 is one, the driving current is P(mA). When two output beams are to be turned on, that is, when the number of beams to be emitted from the device 1 is two, the driving current is 2P(mA). When three output beams are to be turned on, that is, the number of beams to be emitted from the device 1 is three, the driving current is 3P(mA). Here, P(mA) is several milliamperes.

TABLE 1

| | | | | | | | | |
|---|---|---|---|---|---|---|---|---|
| Output Beam $L_1$ | on | off | off | on | on | off | on | off |
| Output Beam $L_2$ | off | on | off | on | off | on | on | off |
| Output Beam $L_3$ | off | off | on | off | on | on | on | off |
| Number of Beams | 1 | 1 | 1 | 2 | 2 | 2 | 3 | 0 |
| Driving Current (mA) | P | P | P | 2P | 2P | 2P | 3P | 0 |

The laser beam L emitted from the laser diode 2, which has an intensity which is proportional to the number of beams into which the laser beam L is to be split, is coupled to the optical waveguide 32 via the incidence prism 35 and travels therein. Meanwhile, the high-frequency electric signal(s) which have been modulated to be on in the modulating circuit 22 are supplied to the transducer 33 of the acoustooptic element 3 as input electric signals, and thereby, surface acoustic waves 38 with the corresponding frequencies are excited on the optical waveguide 32. The high-frequency electric signal(s) which have been modulated to be off are not supplied to the acoustooptic element 3. When the surface acoustic waves 38 and the laser beam L traveling in the optical waveguide 32 acoustooptically interacts with each other, the laser beam L is deflected and split into the desired number of beams. The beams are emergent from the optical waveguide 32 via the emergence prism 36 as the output beams $L_1$, $L_2$ and $L_3$.

With respect to the multi-beam emitting device 1 of the above-described structure, because the laser beam L emitted from the laser diode 2 has an intensity which is proportional to the number of beams into which the laser beam L is to be split, the intensity of each of the output beams $L_1$ through $L_3$ can be kept constant at all times regardless of the number of beams emitted from the multi-beam emitting device 1.

Figure 5:
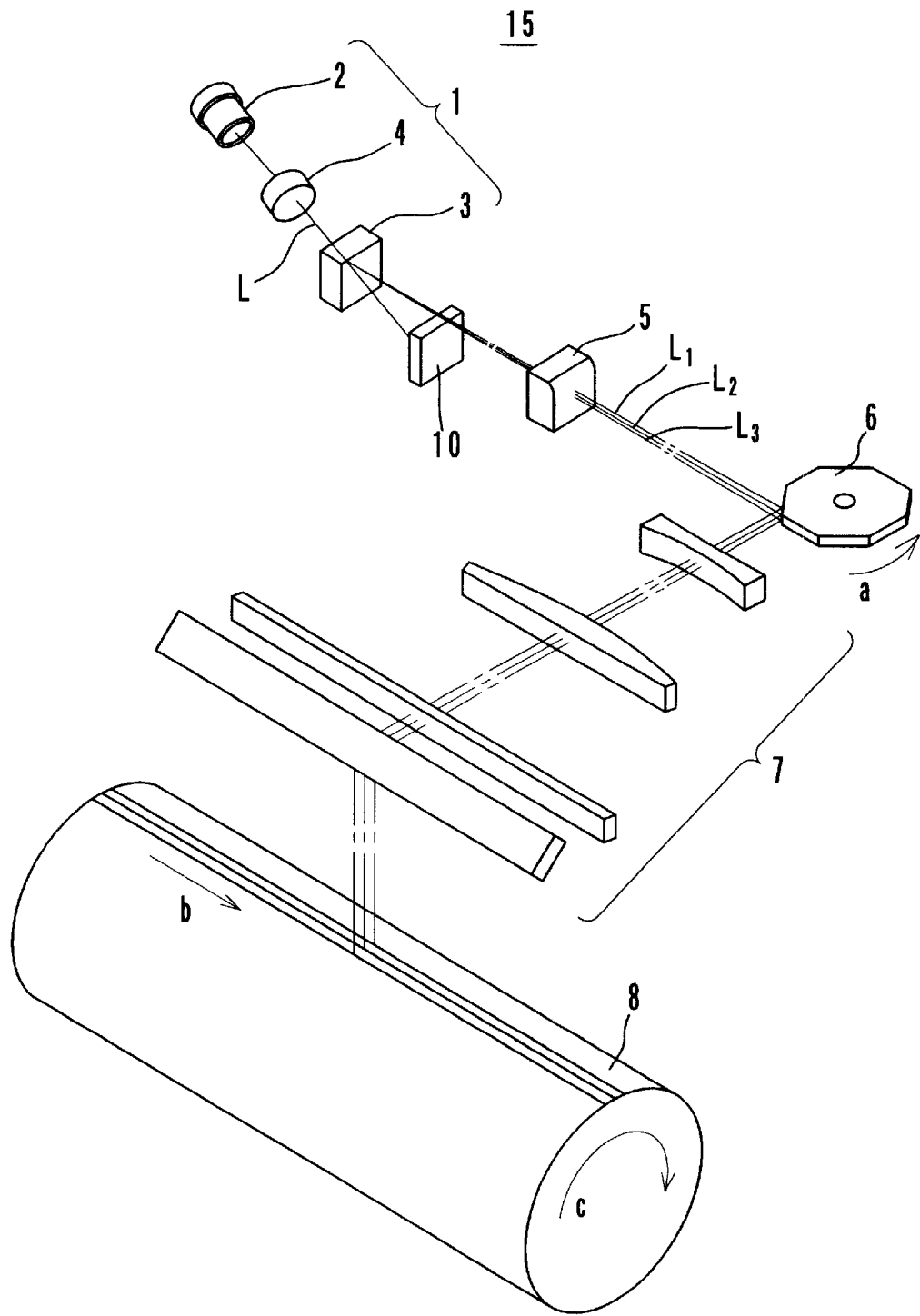
FIG. 5 is a perspective view of a multi-beam scanning optical apparatus provided with the multi-beam emitting device of FIG. 4.

FIG. 5 is a schematic view of a multi-beam scanning optical apparatus 15 provided with the multi-beam emitting device 1. In the multi-beam scanning optical apparatus 15, the laser beam emitted from the laser diode 2 is split into a plurality of beams by the optical waveguide type acoustooptic element 3 which is driven with a plurality of electric signals with different frequencies applied thereto (multi-frequency drive), and these laser beams are scanned simultaneously on a scanning surface. This multi-beam scanning optical apparatus 15 comprises the multi-beam emitting device 1 composed of the laser diode 2, the optical waveguide type acoustooptic element 3 and a convergent lens 4, a convergent lens 5, a polygon mirror 6, a scanning lens system 7 and a shutting plate 10.

The laser beam L emitted from the laser diode 2 has an intensity which is proportional to the number of beams to be emitted from the device 1 and is converged by the convergent lens 4. Then, the laser beam L is diffracted by the acoustooptic element 3 and divided into laser beams $L_1$ through $L_3$. Thereafter, the laser beams $L_1$ through $L_3$ are incident to the polygon mirror 6 via the convergent lens 5. The intensity of each of the laser beams $L_1$ through $L_3$ is kept constant at all times regardless of the number of beams emitted from the multi-beam emitting device 1. Further, a non-diffracted beam $L_0$ generated by the acoustooptic element 3 is shut out by the shutting plate 10 so as not to influence image formation.

With rotation of the polygon mirror 6, the laser beams $L_1$ through $L_3$ are deflected at a constant angular velocity and are incident to the scanning lens system 7. The laser beams $L_1$ through $L_3$ which have passed the scanning lens system 7 are focused on a photosensitive drum 8 and are scanned in the direction of arrow "b" simultaneously. The scanning lens system 7 mainly has a function of changing the main scanning speed of the laser beams $L_1$ through $L_3$ which have been deflected by the polygon mirror 6 at the constant angular velocity to a constant velocity on the photosensitive drum 8, that is, a function of correcting distortion. The photosensitive drum 8 is driven to rotate in a direction of arrow "c" at a constant speed. An electrostatic latent image is formed by the main scanning in the direction of arrow "b" resulting from the deflection by the polygon mirror 6 and the sub scanning in the direction of arrow "c" resulting from the rotation of the photosensitive drum 8. Thus, in the multi-beam scanning optical apparatus 15, quality images can be formed.

Figure 6:
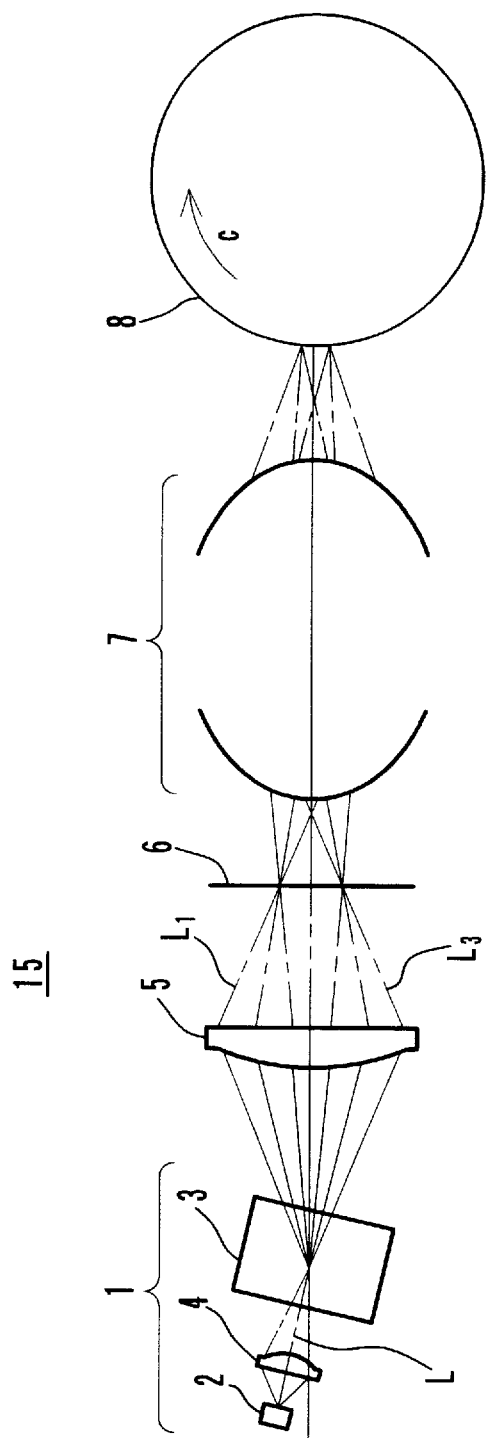
FIG. 6 is an illustration of optical paths in the multi-beam scanning optical apparatus of FIG. 5.

FIG. 6 shows optical paths in the multi-beam scanning optical apparatus 15. In FIG. 6, the optical path of the laser beam $L_2$ is omitted.

Second Embodiment

Figure 7:
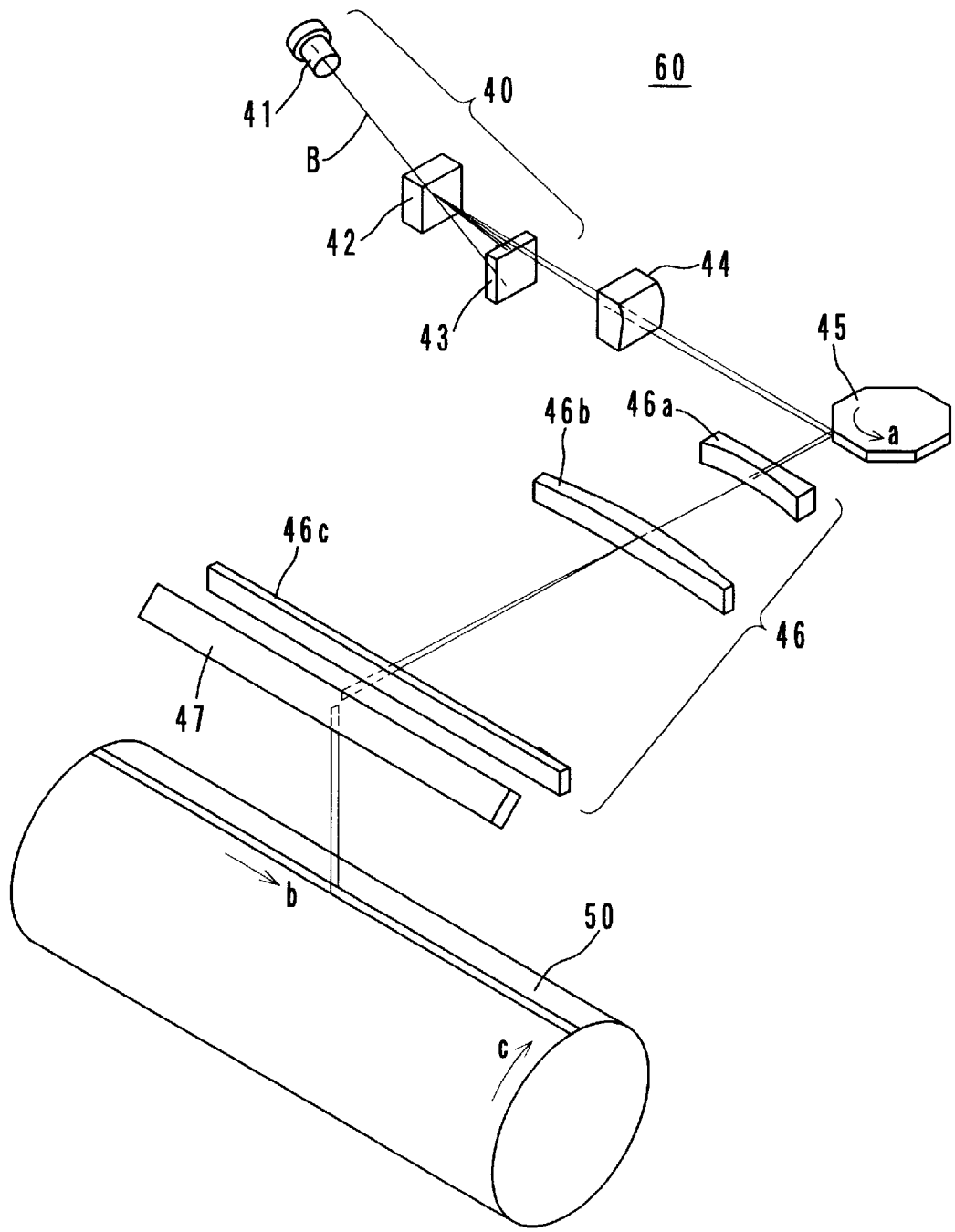
FIG. 7 is a perspective view of a multi-beam scanning optical apparatus which is a second embodiment of the present invention.

FIG. 7 shows a multi-beam scanning optical apparatus 60 which is a second embodiment of the present invention. The multi-beam scanning optical apparatus comprises a multi-beam emitting device 40 composed of a laser diode 41, an optical wavegudie type acoustooptic element 42 and a shutting plate 43, a cylindrical lens 44, a polygon mirror 45, and an fθ lens (composed of lenses 46a, 46b and 46c) and a plane mirror 47.

The laser diode 41 emits a laser beam B with a specified intensity constantly. The laser beam B is changed into a convergent or a parallel bundle of rays by a collimator lens (not shown). The acoustooptic element 42, as the one shown in FIGS. 1 and 2, has an optical waveguide and an interdigital transducer on a substrate. The acoustooptic element 42 is driven with a plurality of signals with different frequencies applied thereto and diffracts the laser beam B at angles which depend on the frequencies. More specifically, shown in FIG. 8, the laser beam B is split into a non-diffracted beam $B_1$, image beams $B_2$ and dummy beams $B_3$, and the non-diffracted beam $B_1$ and the dummy beams $B_3$ are shut out by the shutting plate 43. The image beams $B_2$ pass over the shutting plate 43 and are incident to the polygon mirror 45 via the cylindrical lens 44. The cylindrical lens 44 focuses the image beams $B_2$ on a point near reflective facets of the polygon mirror 45 in a linear form in the direction of the main scanning.

The polygon mirror 45 is driven to rotate in a direction of arrow "a" at a constant velocity. With the rotation of the polygon mirror 45, the image beams $B_2$ are deflected by the reflective facets at a constant angular velocity and then are incident to the fθ lens 46. The image beams $B_2$ pass through the fθ lens 46 and are reflected by the plane mirror 47. Then, the image beams $B_2$ are focused on a photosensitive drum 50 and are scanned in a direction of arrow "b" simultaneously. The fθ lens 46 mainly has a function of changing the main scanning speed of the image beams $B_2$ which have been deflected by the polygon mirror 45 at the constant angular velocity to a constant speed, that is, a function of correcting distortion. Further, the fθ lens 46 corrects errors of perpendicularity of the reflective facets of the polygon mirror 45 in cooperation with the cylindrical lens 44.

The photosensitive drum 50 is driven to rotate in a direction of arrow "c" at a constant velocity. An electrostatic latent image is formed on the photosensitive drum 50 by the main scanning in the direction of arrow "b" realized by the polygon mirror 45 and the fθ lens 46 and the sub scanning in the direction of arrow "c" resulting from the rotation of the photosensitive drum 50.

Figure 8:
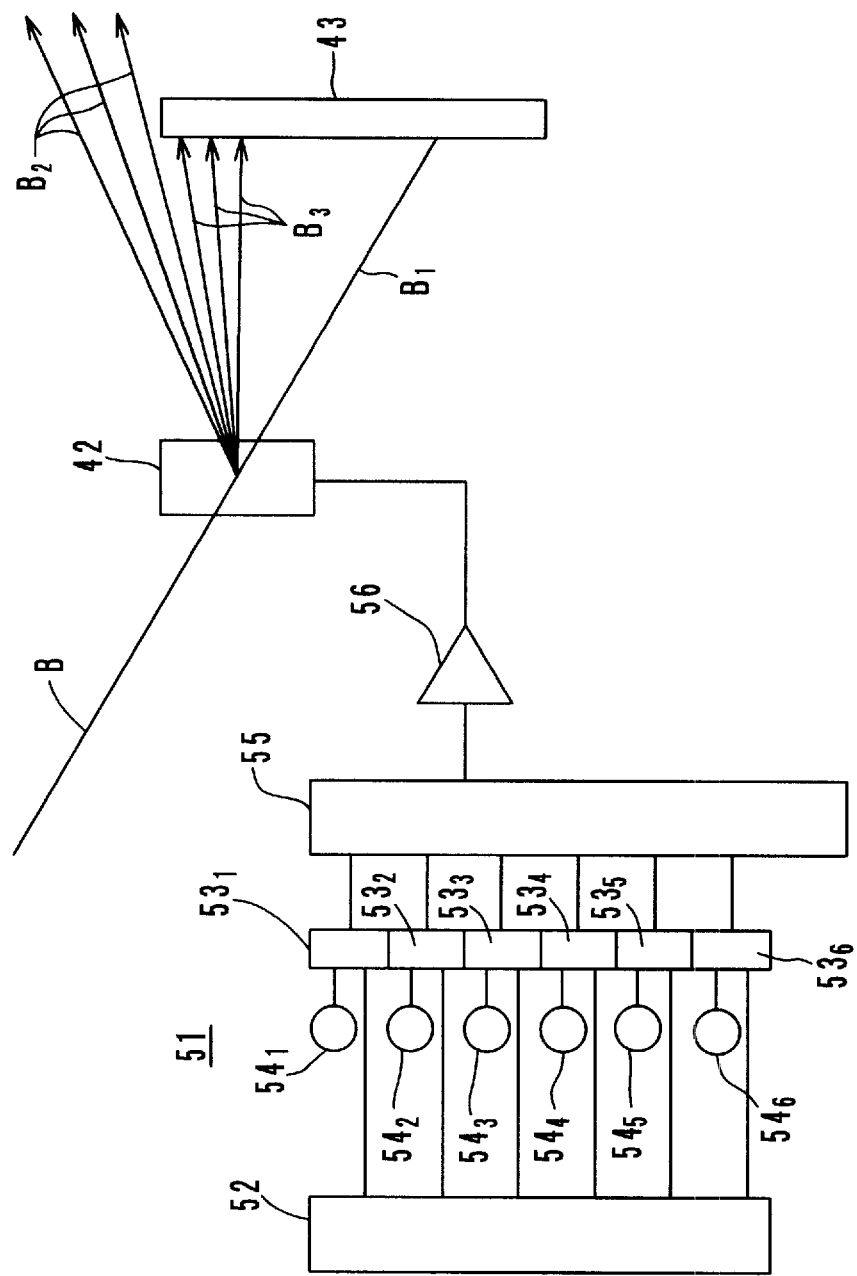
FIG. 8 is an illustration of a beam splitter employed in the optical apparatus of FIG. 7, showing deflection of a light beam and a modulating circuit of the beam splitter.

FIG. 8 shows diffraction of the laser beam B by the acoustooptic element 42 of the multi-beam emitting device 40 and a modulating circuit 51 of the multi-beam emitting device 40. In the second embodiment, the acoustooptic element 42 is driven with six signals with different frequencies applied thereto so that the laser beam B will be diffracted at six different angles. Three of the six diffracted beams pass over the shutting plate 43 and are emergent from the multi-beam emitting device 40 as image beams $B_2$. The other three diffracted beams (dummy beams $B_3$) and the non-diffracted beam $B_1$ are shut out by the shutting plate 43.

Figure 9:
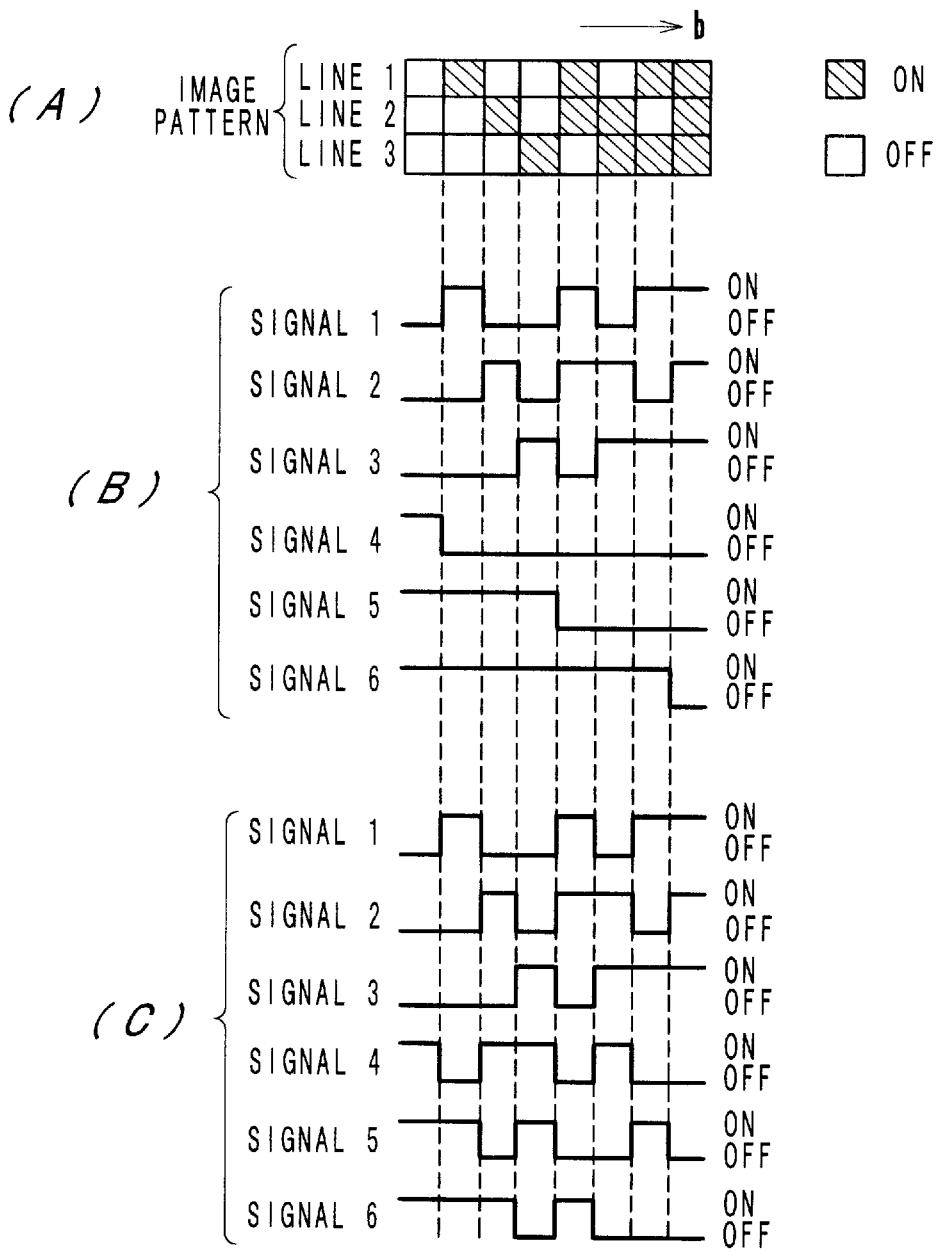
FIGS. 9A–9C are charts showing an image pattern formed by the optical apparatus of FIG. 7 and modulating signals of the beam splitter used for the formation of the image pattern.

The modulating circuit 51 comprises an image signal generator 52, six modulators $53_1$ through $53_6$, six oscillators $54_1$ through $54_6$, an adder 55 and an amplifier 56. The image signal generator 52 sends image signals controlling the image beams $B_2$ and light quantity control signals controlling the dummy beams $B_3$ to the modulators $53_1$ through $53_6$. The image signals and the light quantity control signals are turned on and off as shown in (B) and (C) of FIG. 9 and will be described later. The modulators $53_1$ through $53_6$ receive electric signals with different frequencies respectively from the oscillators $54_1$ through $54_6$, and only when the respective image signals and light quantity control signals are on, the modulators $53_1$ through $53_6$ send the individual electric signals to the adder 55. These electric signals are added in the adder 55 and amplified by the amplifier 56. Then, the electric signals with different frequencies are supplied to the acoustooptic element 42. The acoustooptic element 42 diffracts the laser beam B at angles which depend on the frequencies of the electric signals, and the diffracted beams are emergent from the acoustooptic element 42 as the image beams $B_2$ and the dummy beams $B_3$.

FIG. 9(A) shows an image pattern which is formed by simultaneous scanning of three lines. Shadowed regions (pixels) are to be printed, in other words, the image signals are on in these regions. FIG. 9(B) shows the signals which are outputted from the modulators $53_1$ through $53_6$ for formation of the image pattern of FIG. 9(A). The signals 1 through 3 are to write the lines 1 through 3 and are outputs from the modulators $53_1$ through $53_3$ respectively. The signals 4 through 6 are to control the quantities of light of the image beams $B_2$ and are not used for image writing, and these signals 4 through 6 are outputs from the modulators $53_4$ through $53_6$ respectively. The signal 4 is turned on only when all the image beams $B_2$ are off. The signal 5 is turned on when one of the image beams $B_2$ is on and when all the image beams $B_2$ are off. The signal 6 is turned on when one or two of the image beams $B_2$ is/are on and when all the image beams $B_2$ are off. With this control, either three of the beams $B_2$ and $B_3$ are always on, and the total quantitiy of light of the turned-on beams $B_2$ and $B_3$ is constant. Accordingly, there is no possibility that a scramble for power, which results in deterioration in picture quality, may occur. Needless to say, it is no longer necessary to detect the intensities of beams with a sensor and to feedback the detection result for light intensity control.

FIG. 9(C) shows another example of controlling the signals for formation of the image pattern of FIG. 9(A). As in the example of FIG. 9(B), the signals 1 through 3 are to write the lines 1 through 3, and the signals 4 through 6 are to control the quantities of light of the image beams $B_2$. In this example, the signal 4 is turned off when the signal 1 is on, the signal 5 is turned off when the signal 2 is on, and the signal 6 is turned off when the signal 3 is on. With this control, the total quantity of light of the turned-on beams $B_2$ and $B_3$ is always constant, and a scramble for power can be avoided. Although the case wherein the number of image beams is three has been described with respect to the multi-beam scanning optical apparatus 60, the number of image beams may be two, four or more, and the number of dummy beams is determined depending on the number of image beams.

Next, a multi-beam scanning optical apparatus which writes a multi-gradation image is described. The apparatus itself is of the same structure as the apparatus shown by FIGS. 7 and 8. Also, it is the same as the apparatus shown by FIGS. 7 and 8 that the acoustooptic element 42 splits a laser beam B into three image beams $B_2$ and three dummy beam $B_3$. The intensities of the beams $B_2$ and $B_3$ are changed by controlling the amplitudes of the electric signals with different frequencies outputted from the oscillators $54_1$ through $54_6$.

Figure 10:
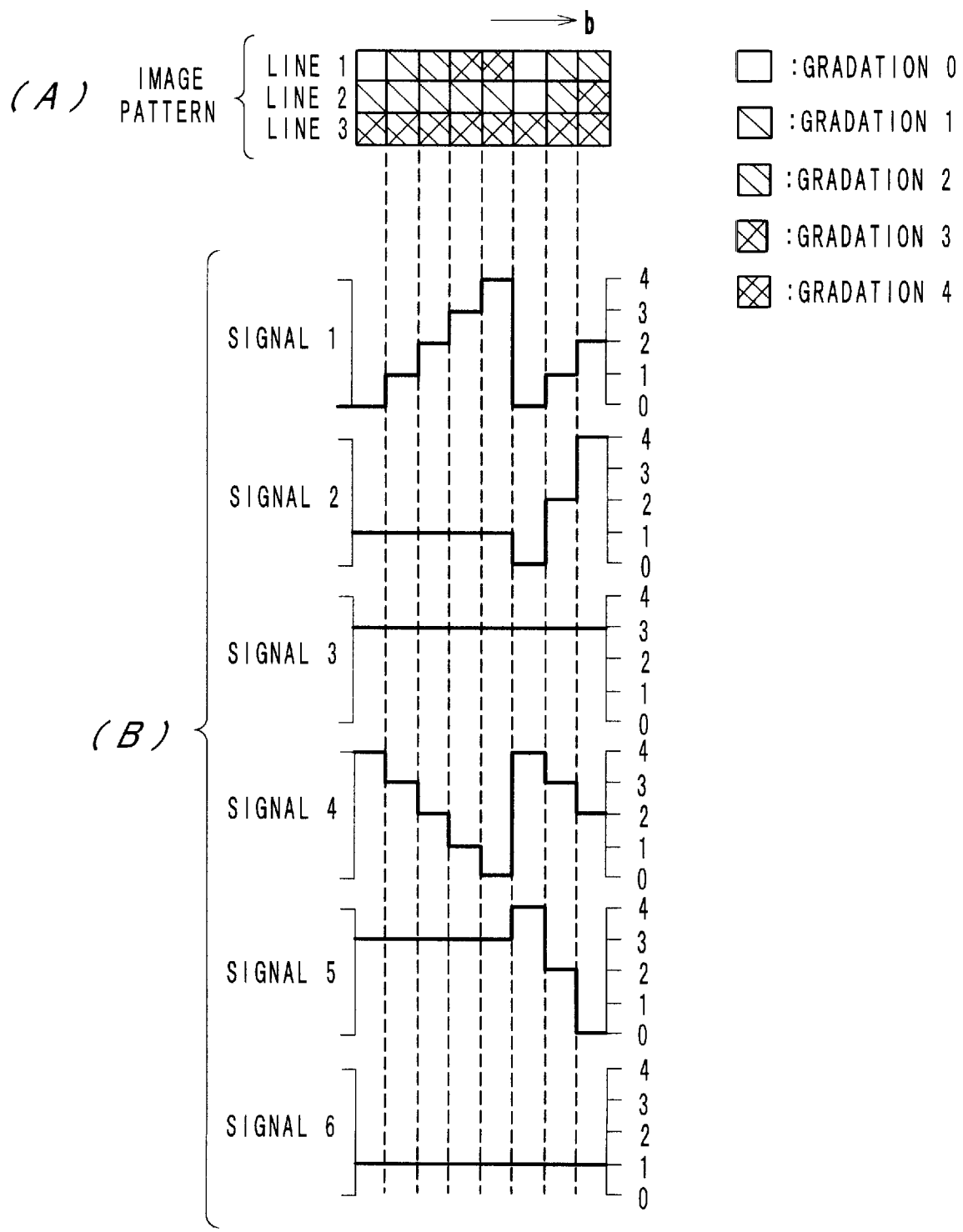
FIGS. 10A and 10B are charts showing another image pattern formed by the optical apparatus of FIG. 7 and modulating signals of the beam splitter used for the formation of the image pattern.
Figure 11:
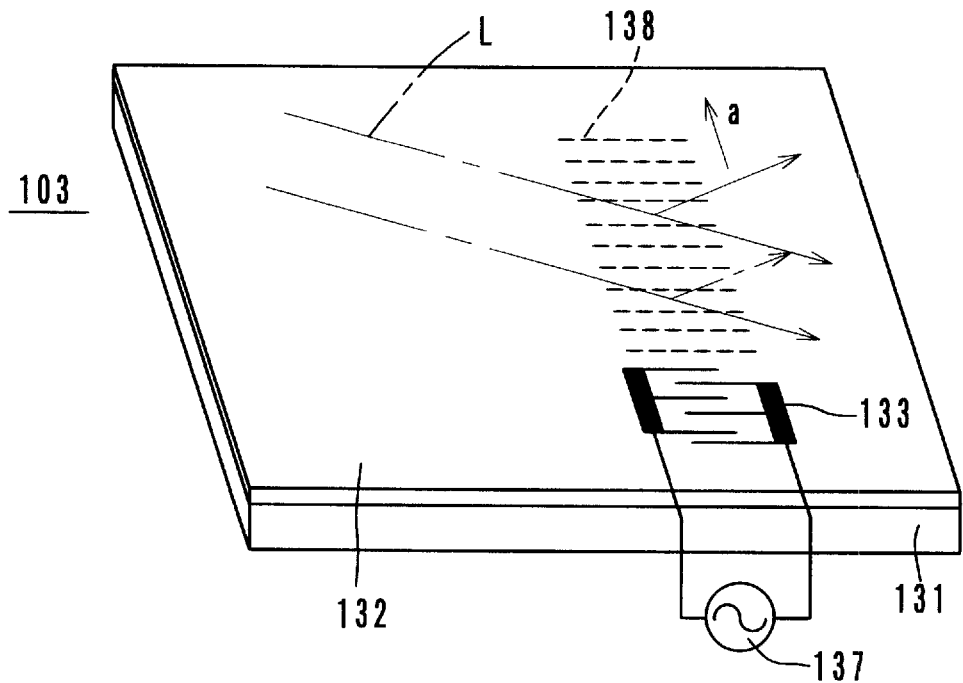
FIG. 11 is a perspective view of an optical waveguide type acoustooptic element which is employed in a multi-beam emitting device which is a third embodiment of the present invention.
Figure 12:
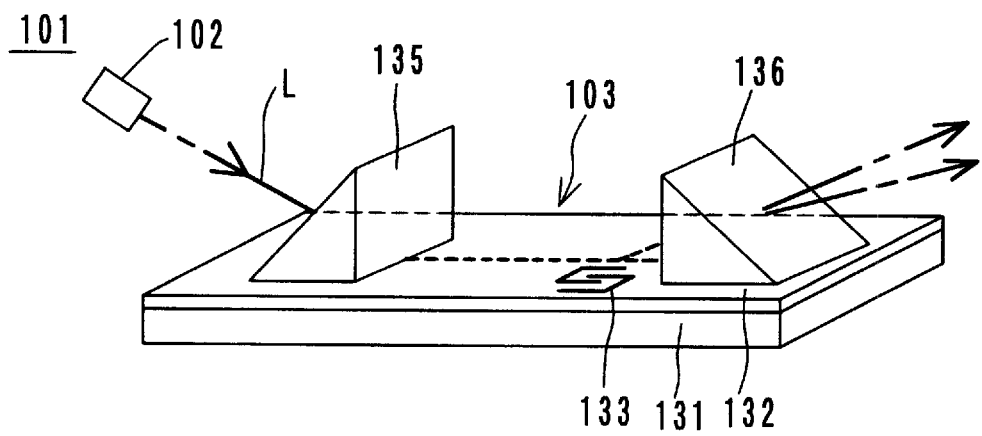
FIG. 12 is another perspective view of the optical waveguide type acoustooptic element of FIG. 11.

FIG. 10(A) shows an image pattern which is formed by simultaneous scanning of three lines. Each pixel is to be printed with any of gradations from 1 (blank) through 4 (the thickest). FIG. 10(B) shows signals which are outputted from the modulators $53_1$ through $53_6$ for the formation of the image pattern of FIG. 10(A). The signals 1 through 3 are to write the lines 1 through 3 and are outputs from the modulators $53_1$ through $53_3$. The signals 4 through 6 are to be used for light quantity control and are outputs from the modulators $53_4$ through $53_3$. The signals 4 is coupled with the signal 1, the signal 5 is coupled with the signal 2, and the signal 6 is coupled with the signal 3. The signals 1 through 3 are set to light quantity levels 0 through 4 in accordance with the gradations 0 through 4. Meanwhile, the signals 4 through 6 are set to the light quantity levels 4 through 0 inverse to the light quantity levels of the respective coupled signals 1 through 3. With this control, each of the coupled signals 1 and 4, 2 and 5, and 3 and 6 always has a total quantity of light of level 4. In this way, in forming a multi-gradation image, the total quantity of light of the image beams $B_2$ and the dummy beams $B_3$ is always constant. Thereby, a scramble for power, which results in deterioration in picture quality, can be avoided. Although a case of forming a five-gradation image has been described in connection with this multi-beam scanning optical device, in any case of forming an image with less or more gradation levels, a scramble for power can be prevented by making the same number of dummy beams as the number of image beams and controlling the quantities of light of the dummy beams in the above-described manner. Also, needless to say, similar control is possible even if the number of image beams is other than three Third Embodiment FIGS. 11 and 12 show an optical waveguide type acoustooptic element 103 to be employed in a multi-beam emitting device 101 which is a third embodiment of the present invention. The acoustooptic element 103 is of a laminate type composed of a substrate 131 and an optical waveguide 132. On the optical waveguide 132, in a front right part of the center, an interdigital transducer 133 which is an ultrasonic oscillator is provided. On the optical waveguide 132, further, an incidence prism 135 and an emergence prism 136 are provided in the left side and the right side, respectively.

In the optical waveguide type acoustooptic element 103 of this structure, the transducer 133 excites surface acoustic waves 138 on the optical waveguide 132 when it is supplied with a high-frequency electric signal from a high-frequency power source 137. As the high-frequency power source 137, for example, a VCO (voltage control oscillator) is used. The surface acoustic waves 138 are propagated in a direction of arrow "a" on the optical waveguide 132.

Meanwhile, a laser diode 102 emits a laser beam L, and the laser beam L is coupled to the optical waveguide 132 via the incidence prism 135 and travels therein. The refractive index of the optical waveguide 132 is periodically altered by the surface acoustic waves 138, and this serves as a diffraction grating of the laser beam L. Accordingly, when the laser beam L crosses the surface acoustic waves 138, an acoustooptic interaction (Bragg diffraction) occurs between the laser beam L and the surface acoustic waves 138, and thereby, the laser beam L is deflected as shown in FIG. 11.

The angle of Bragg diffraction of the laser beam L depends on the frequency of the surface acoustic waves 138, which depends on the frequency of the signal supplied to the transducer 133. Therefore, when a plurality of electric signals with different frequencies are applied to the transducer 133, the transducer 133 excites surface acoustic waves 138 with different frequencies, and thereby, the laser beam L is diffracted and deflected at different angles. Consequently, as shown in FIG. 12, the laser beam L is split into a plurality of beams. The beams are emergent from the optical waveguide 132 via the emergence prism 136.

Figure 13:
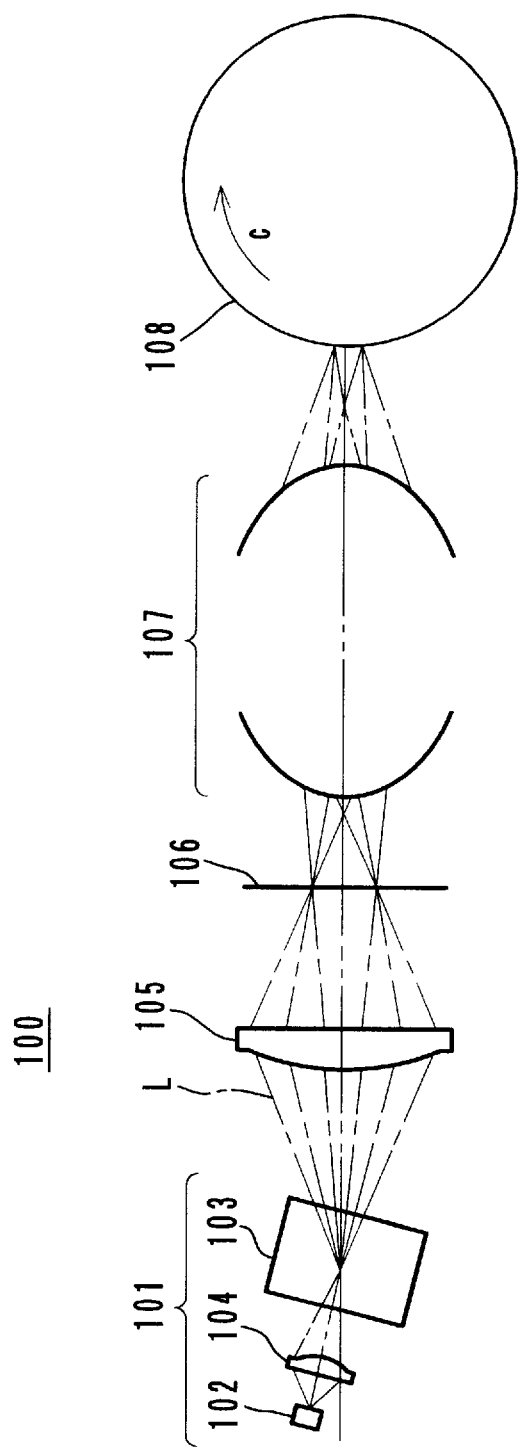
FIG. 13 is an illustration of optical paths in a multi-beam scanning optical apparatus provided with the multi-beam emitting device of the third embodiment.

FIG. 13 is a schematic view of a multi-beam scanning optical apparatus 100 provided with the optical waveguide type acoustooptic element 103. In the multi-beam optical scanning device 100, the optical waveguide type acoustooptic element 103 is driven with a plurality of electric signals with different frequencies applied thereto (multi-frequency drive) so as to split the laser beam emitted from the laser diode 102 into a plurality of beams, and these beams are scanned on a scanning surface simultaneously. This multi-beam scanning optical apparatus 100 comprises the multi-beam emitting device 101 composed of the laser diode 102, the optical waveguide type acoustooptic element 103 and a convergent lens 104, a convergent lens 105, a polygon mirror 106 and a scanning lens system 107.

The laser diode 102 is modulated (turned on and off) based on image data transmitted to a driving circuit (not shown), and it emits a laser beam L when it is on. The laser beam L is converged by the convergent lens 4 and split into a plurality of beams by the optical waveguide type acoustooptic element 103. Then, the beams are incident to the polygon mirror via the convergent lens 105.

With rotation of the polygon mirror 106, the beams are deflected by reflective facets of the polygon mirror 106 at a constant angular velocity, and the deflected beams are incident to the scanning lens system 107. The beams which have passed through the scanning lens system 107 are focused on a photosensitive drum 108 and are scanned simultaneously in a direction perpendicular to the plane of FIG. 13. The scanning lens system 107 mainly has a function of changing the main scanning speed of the beams deflected by the polygon mirror 106 at the constant angular velocity to a constant velocity on the photosensitive drum 108, that is, a function of correcting distortion. The photosensitive drum 108 is driven to rotate in a direction of arrow "c" at a constant velocity. An electrostatic latent image is formed by the main scanning in the direction perpendicular to the plane of FIG. 13 resulting from the rotation of the polygon mirror 106 and the sub scanning in the direction of arrow "c" resulting from the rotation of the photosensitive drum 108.

Figure 14:
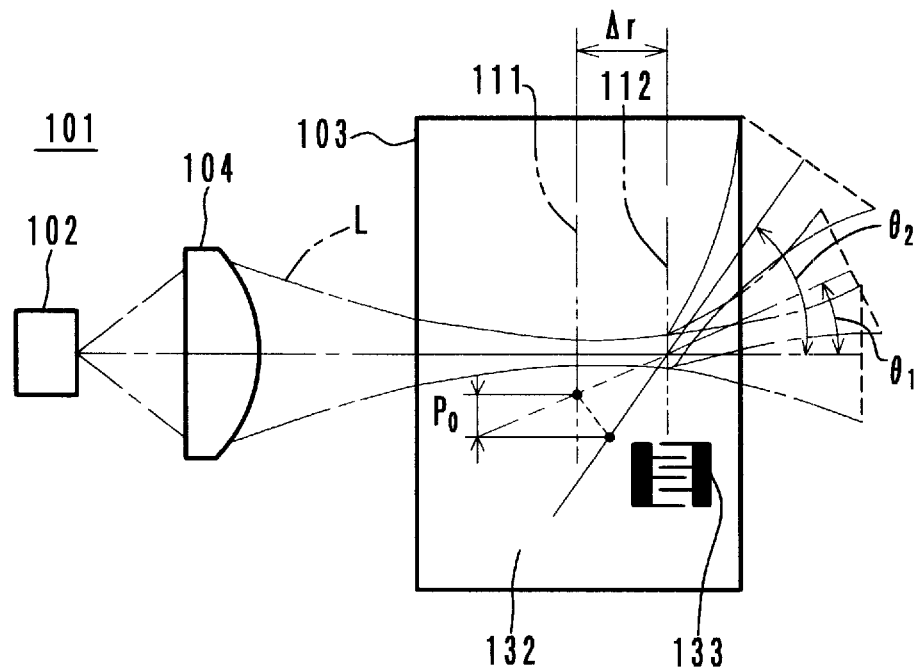
FIG. 14 is an illustration of optical paths formed by the multi-beam emitting device shown in FIG. 13.

Further, in order to correct errors of perpendicularity of the reflective facets of the polygon mirror 106, the scanning lens system 107 also has a function of making a conjugation relationship between the reflective facets of the polygon mirror 106 and the surface of the photosensitive drum 108. As shown in FIG. 14, the acoustooptic element 103 is located in such a position that the beam waist of the laser beam L indicated by the alternate long and short dash line 111 will be positioned substantially in the center of the acoustooptic element 103. The deflecting position of the interdigital transducer 133 which is indicated by the alternate long and short dash line 112 is downstream in the optical path from the beam waist position 111 at a distance $\Delta r$.

Here, for a speed-up (good rising characteristic) of modulation of the laser beam L, it is preferred that the diameter $D_m$ of the laser beam L at the deflecting position 112 is not more than a specified value, for example, not more than 85 µm. Also, for facile setting of the magnification and the beam diameter in designing lenses of such an optical system using a laser diode, it is preferred that the relationship between the diameter $D_0$ of the laser beam L at the beam waist position 111 and the interval $P_0$ between adjacent deflected beams at the beam waist position 111 (see FIG. 14) is proportional to the relationship between the beam diameter $D_v$ on the photosensitive drum 108 in the sub scanning direction and the interval $P_i$ between adjacent scanning lines, that is, it is preferred that the following condition (1) is fulfilled.

$$P_0/D_0 = C(P_i/D_v) \tag{1}$$

C: proportional constant (magnification) of the optical system

Meanwhile, if the intensity of the laser beam L has a Gaussian normal distribution, there is a relationship expressed by the following expression (2). In the expression (2), $\Delta$ denotes a distance into which the distance $\Delta r$ is convereted when it is supposed that the optical path between the beam waist position 111 and the deflecting position 112 is in the air. If the refractive index of the optical waveguide 132 toward a laser beam with a wavelength $\lambda$ is n, $\Delta r = n\Delta$.

$$D_m/D_0 = [1 + \{4\lambda\Delta/(\pi D_0^2)\}^2]^{1/2} \tag{2}$$

The following expression (3) is obtained from the expression (2).

$$\Delta = \pi D_0 (D_m^2 - D_0^2)^{1/2}/4\lambda \tag{3}$$

Between the converted distance $\Delta$ and the interval $P_0$ (at the beam waist position 111) between the laser beams made by deflection of the laser beam L at angles $\theta_1$ and $\theta_2$ ($\theta_2 > \theta_1$) respectively, there is a relationship expressed by the following expression (4) when the angles $\theta_1$ and $\theta_2$ are sufficiently small because $\sin \theta_1$ and $\sin \theta_2$ can be regarded to be almost $\theta_1$ and $\theta_2$ respectively.

$$P_0 = \Delta(\sin \theta_2 - \sin \theta_1) = \Delta(\theta_2 - \theta_1) \tag{4}$$

The following expressions can be obtained from the expressions (3) and (4).

$$P_0/D_0 = \pi(\theta_2 - \theta_1)(D_m^2 - D_0^2)^{1/2}/4\lambda$$

$$D_m^2 - D_0^2 = [4\lambda/\{\pi(\theta_2 - \theta_1)\}]^2 (P_0/D_0)^2$$

Further, by using the expression (1), the following expression is obtained.

$$D_m^2 - D_0^2 = \{4\lambda C P_i/\pi(\theta_2 - \theta_1)\}^2 (P_i/D_v)^2$$

In this expression, $P_i$ and $D_v$ are values which are determined depending on the scanning specification, C and $\lambda$ are values which are determined depending on the optical system specification, and $D_m$, $\theta_1$, and $\theta_2$ are values which are determined depending on the specification of the optical waveguide type acoustooptic element.

Therefore, in the multi-beam emitting device 101, there is a relationship expressed by the following expression (5).

$$D_0^2 = D_m^2 - [4\lambda C P_i/\{\pi(\theta_2 - \theta_1)\}]^2 (P_i/D_v)^2 > 0$$

$$D_m > 4\lambda C P_i/\{\pi(\theta_2 - \theta_1)D_v\} (>0) \tag{5}$$

Next, referring to specific values, how to calculate the distance $\Delta$ is described.

If $D_m = 85$ µm, $\theta_2 - \theta_1 = 0.8°$, $P_i/D_v = 1$, $\lambda = 0.78$ µm and $C = 1$,
$D_0 = [0.085^2 - [(4 \times 0.78 \times 10^{-3} \times 1)/\{(\pi^2/180) \times 0.8\}]^2 \times 1^2]^{1/2} = 46.5$ (µm).

When a lens which realizes $D_0=46.5(\mu m)$ is used as the convergent lens 104, the distance $\Delta$ can be calculated to be 3.33 mm from the expression (3). If the refractive index of the optical waveguide 132 is n, the actual distance $\Delta r$ on the optical waveguide 132 is calculated by n×3.33.

In this multi-beam emitting device 101, because the beam waist position 111 is inside the acoustooptic element 103, the object points of the beams split from the laser beam L are inside the acoustooptic element 103. Therefore, even if the relative position of the acoustooptic element 103 to the other optical elements 2, 4, 5, 6 and 7 shifts due to a change in environments, aging, etc., the object points of the beams shift equally, and the positional relationship between the beam waist position 111 and the deflecting position 112 hardly changes. Consequently, the intervals among scanning lines on the photosensitive drum 8 can be kept constant.

Also, because the object points of the beams split from the laser beam L are inside the acoustooptic element 103, even if an error in driving the acoustooptic element 103 occurs due to a change in environments, fluctuation of the electric power, etc., the object points shift by the difference between shifts of the deflection angles $\theta_1$ and $\theta_2$, and the shifts of the object points are not affected by fluctuation of the angles of the beams emergent from the acoustooptic element 103 into the air. Consequently, the intervals among scanning lines on the photosensitive drum 8 can be kept constant.

Even with this optical waveguide type acoustooptic element 103, there are astigmatic differences among the beams split from the laser beam L. However, it is relatively easy to provide an element which has a function of correcting the astigmatic differences, such as a refractive index distributor, a diffraction grating, an optical waveguide lens or the like, in the optical waveguide 132, and optical waveguide type acoustooptic elements provided with such an element can be mass-produced.

Thus, in the multi-beam scanning optical apparatus 100, the intervals among scanning lines can be kept constant, and the astigmatic differences can be minimized.

In the multi-beam scanning optical apparatus 100, also, because the beam waist position 111 is located substantially in the center of the optical path in the acoustooptic element 103, because adjacent beams after the deflection by the acoustooptic element 103 fulfill the condition: $D_m > 4\lambda \cdot CP_i / \{\pi(\theta_2-\theta_1)D_v\}$ mand because the converted distance $\Delta$ fulfills the condition: $\alpha = \pi D_0 (D_m^2 - D_0^2)^{1/2}/4\lambda$, the sectional area of the laser beam L at the time of incidence to the optical waveguide 132 and the sectional areas of the beams split from the laser beam L at the time of emergence from the optical wavegudie 132 can be minimized, and the accuracy of flatness and smoothness required for the incidence/emergence transmitting surfaces of the optical waveguide 132 can be eased. Further, it is preferred that the beam waist position 111 is near the interface of the optical waveguide 132 with the outside. In this case, the sectional area of the laser beam L at the time of incidence to the optical waveguide 132 and the sectional areas of the beams split from the laser beam L can be more reduced, and the accuracy of flatness and smoothness of the transmitting surfaces can be more eased.

Figure 15:
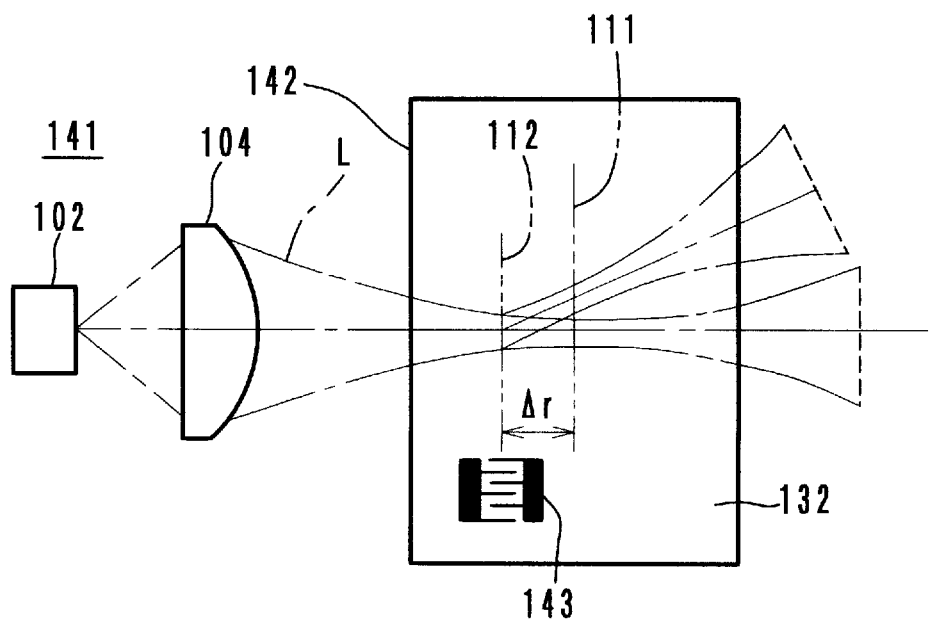
FIG. 15 is an illustration of optical paths formed by another example of the multi-beam emitting device of the third embodiment.

FIG. 15 shows another multi-beam emitting device 141 according to the third embodiment. An optical waveguide type acoustooptic element 142 provided in the device 141 is of the same structure as the optical waveguide type acoustooptic element 103, except that the interdigital transducer 143 is different from the one 133 of the acoustooptic element 103.

The interdigital transducer 143 is located on the optical waveguide 132, in a left front part of the center. Although they are not shown, an incidence prism and an emergence prism are provided in the left side and the right side respectively. The acoustooptic element 142 is so located that the beam waist 111 of the laser beam L will be substantially in the center of an optical path in the element 142. The position 112 of deflection made by the interdigital transducer 143 is upstream in the optical path from the beam waist position 111 at a distance $\Delta r$.

A multi-beam scanning optical apparatus provided with the multi-beam emitting device 141 with the optical waveguide type acoustooptic element 142 of this structure brings out the same effects as the multi-beam scanning optical apparatus 100 does. Further, if the beam waist 111 is positioned in the right side of the acoustooptic element 142 (see FIG. 15), the sectional areas of the beams split from the laser beam L at the emergence from the optical waveguide 132 are smaller, and therefore, the accuracy of flatness and smoothness of the transmitting surface can be eased. In this case, also, the astigmatic differences are smaller.

In a conventional multi-beam scanning optical apparatus, in order to switch the image density, the deflecting position is changed by shifting the ultrasonic oscillator along the optical axis. Accordingly, there has been a problem that the switch of the image density is likely to be influenced by an error in shifting the ultrasonic oscillator. In order to solve this problem, next, a multi-beam scanning optical apparatus which can switch the image density accurately at all times is suggested.

Figure 16:
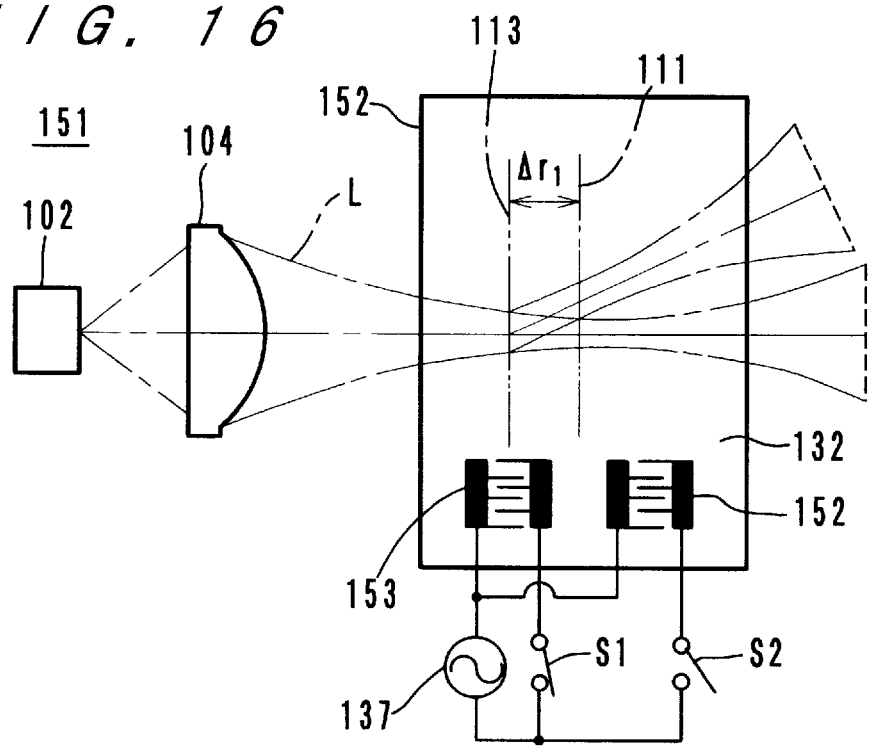
FIG. 16 is an illustration of optical paths formed by another example of the multi-beam emitting device of the third embodiment.

FIG. 16 shows a multi-beam emitting device 151 to be employed in the multi-beam scanning optical apparatus. The multi-beam emitting device 151 is of the same structure as the multi-beam emitting device 141, except that a different optical waveguide type acoustooptic element 152 is provided and that switches S1 and S2 are provided. The optical waveguide type acoustooptic element 152 has an optical waveguide 132 on a substrate, and on the optical waveguide 132, an interdigital transducer 153 for low image density and an interdigital transducer 154 for high image density are provided in the left part of the center and in the right part of the center, respectively. Although they are not shown, an incidence prism and an emergence prism are further provided on the optical waveguide 132.

The acoustooptic element 152 is so located that the beam waist 111 is positioned substantially in the center of the optical path in the acoustooptic element 152. The deflecting position 113 of the low density interdigital transducer 153 is upstream in the optical path from the beam waist position 111 at a distance $\Delta r_1$, and the deflecting position 114 of the high density interdigital transducer 154 is downstream in the optical path from the beam waist position 111 at a distance $\Delta r_2$ (see FIG. 17).

The beam diameter $D_{m1}$ at the deflecting position 113 and the distance $\Delta_1$ into which the distance $\Delta r_1$ is converted when it is supposed that the optical path is in the air fulfill the conditions expressed by the above expressions (3) and (5), respectively. Likewise, the beam diameter $D_{m2}$ at the deflecting position 114 and the distance $\Delta_2$ into which the distance $\Delta r_2$ is converted when it is supposed that the optical path is in the air fulfill the conditions expressed by the expressions (3) and (5), respectively. The interdigital transducers 153 and 154 are connected to a high-frequency power source 137 via the switches S1 and S2, respectively.

Figure 17:
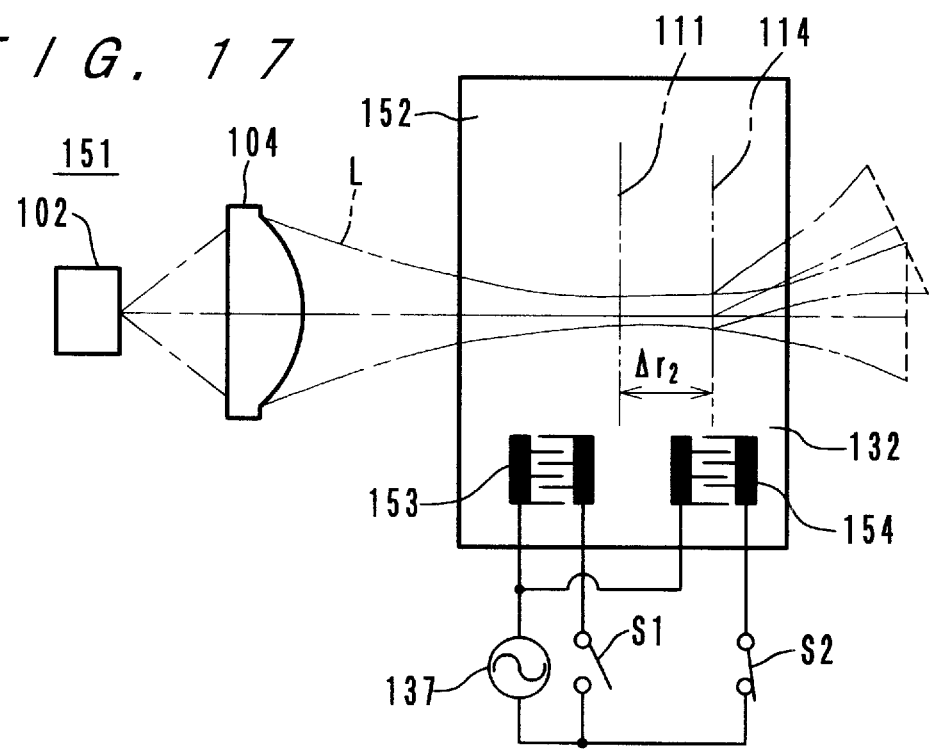
FIG. 17 is an another illustration of optical paths formed by the example of the multi-beam emitting device of FIG. 16.

With this multi-beam emitting device 151, when an image with a low density is to be formed on a scanning surface, as shown in FIG. 16, the switches S1 and S2 are turned on and off, respectively, so that a laser beam L emitted from a laser diode 102 is deflected at the deflecting position 113 and is split into a plurality of beams. In this case, the intervals among scanning lines on the scanning surface are large. On the other hand, when an image with a high density is to be formed on the scanning surface, as shown in FIG. 17, the switches S1 and S2 are turned off and on, respectively, so that the laser beam L is deflected at the deflecting position 114 and is split into a plurality of beams. In this case, the intervals among scanning lines on the scanning surface are small.

Thus, with the multi-beam emitting device 151 which is of a simple structure wherein the deflecting position can be switched between the positions 113 and 114 by use of the switches S1 and S2, the image density can be switched accurately and stably. Needless to say, the multi-beam emitting device 151 has the same effects as the multi-beam emitting device 101 shown in FIG. 14 does.

Figure 18:
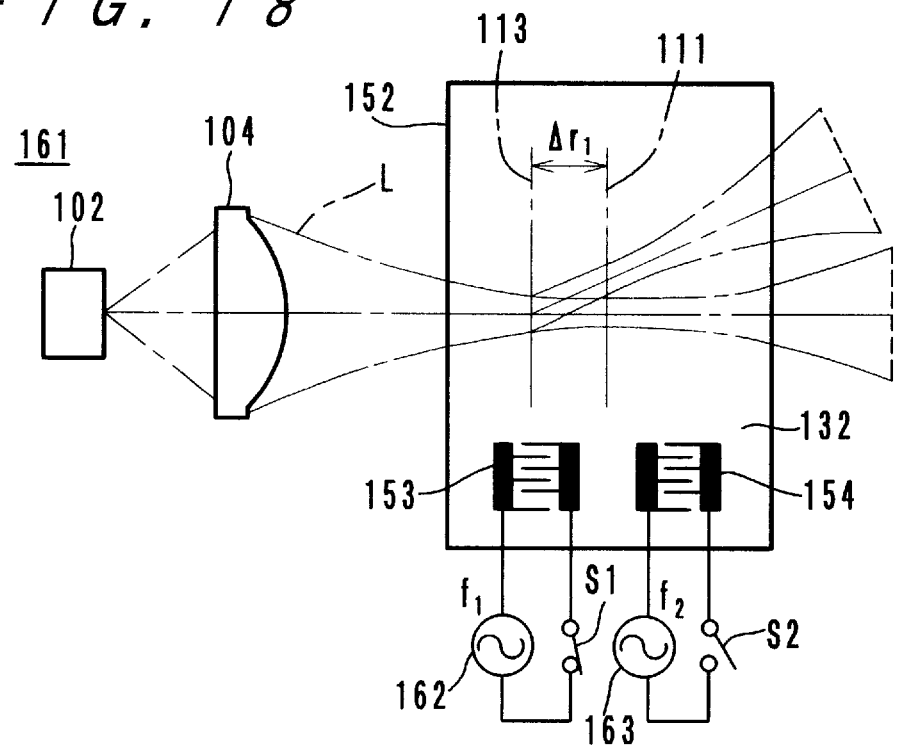
FIG. 18 is an illustration of optical paths formed by another example of the multi-beam emitting device of the third embodiment.

FIG. 18 shows another multi-beam emitting device 161 which realizes accurate and stable switch of image density. This multi-beam emitting device 161 is of the same structure as the multi-emitting device 151, except that two high-frequency power sources 162 and 163 are provided. The high-frequency power sources 162 and 163 apply signals with mutually different high frequencies $f_1$ and $f_2$ to the low density interdigital transducer 153 and the high density interdigital transducer 154 via the switches S1 and S2, respectively.

Figure 19:
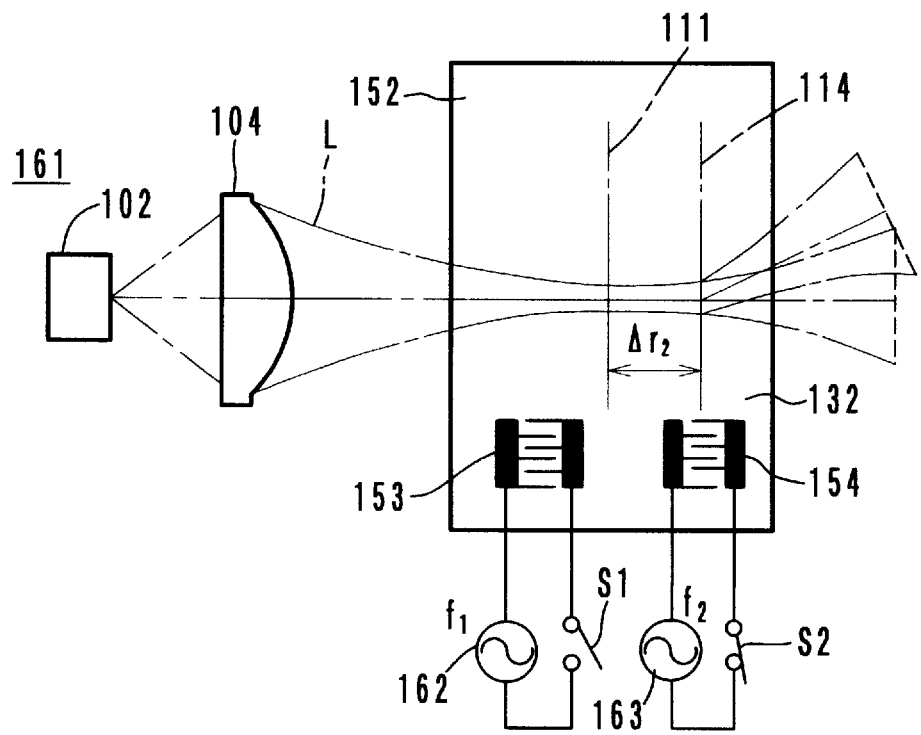
FIG. 19 is an another illustration of optical paths formed by the example of the multi-beam emitting device of FIG. 18.
Figure 21:
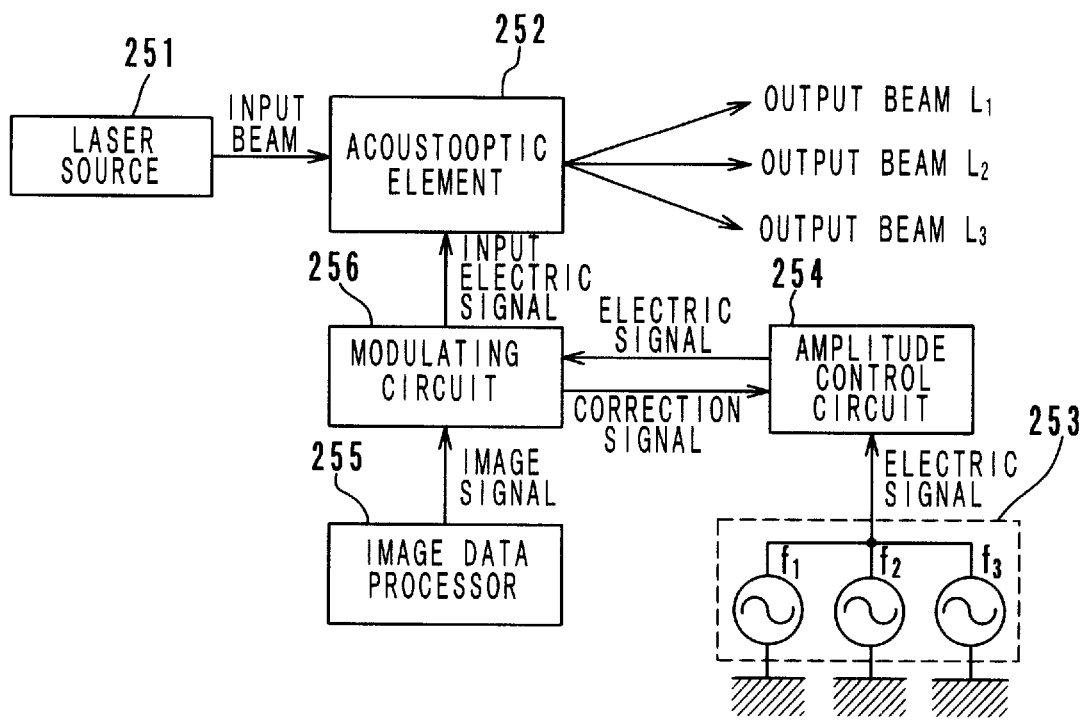
FIG. 21 is a block diagram of a conventional multi-beam emitting device.
Figure 22:
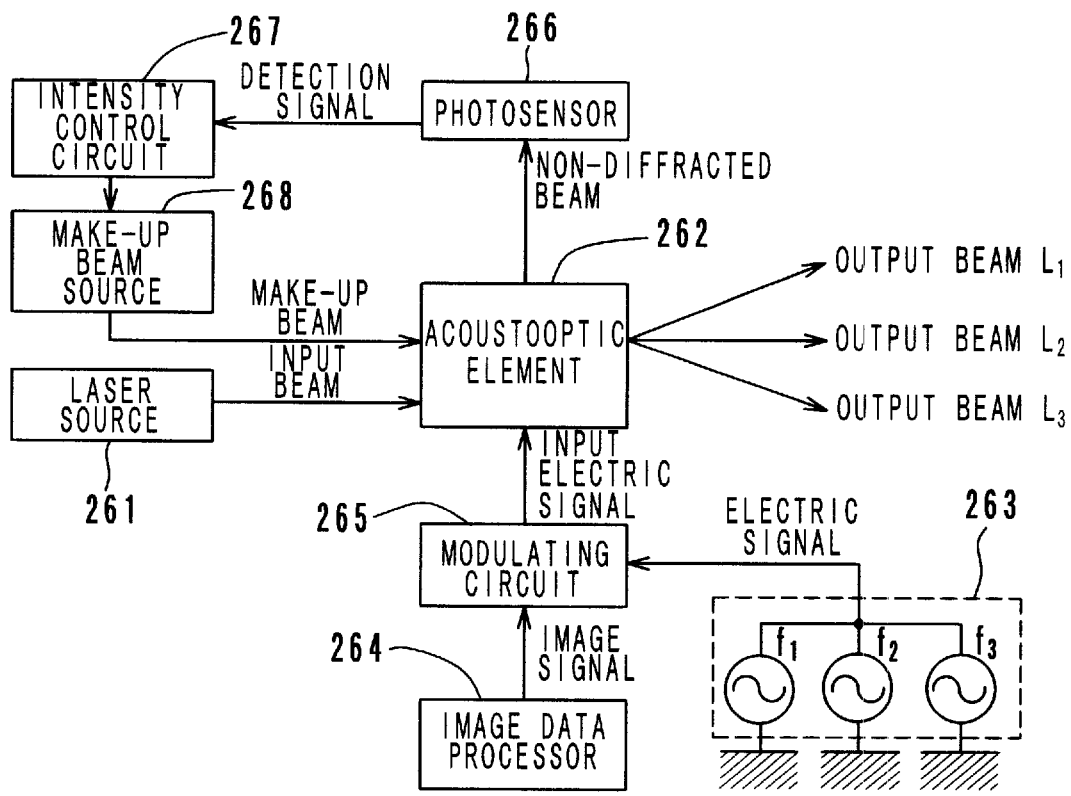
FIG. 22 is a block diagram of another conventional multi-beam emitting device.
Figure 23:
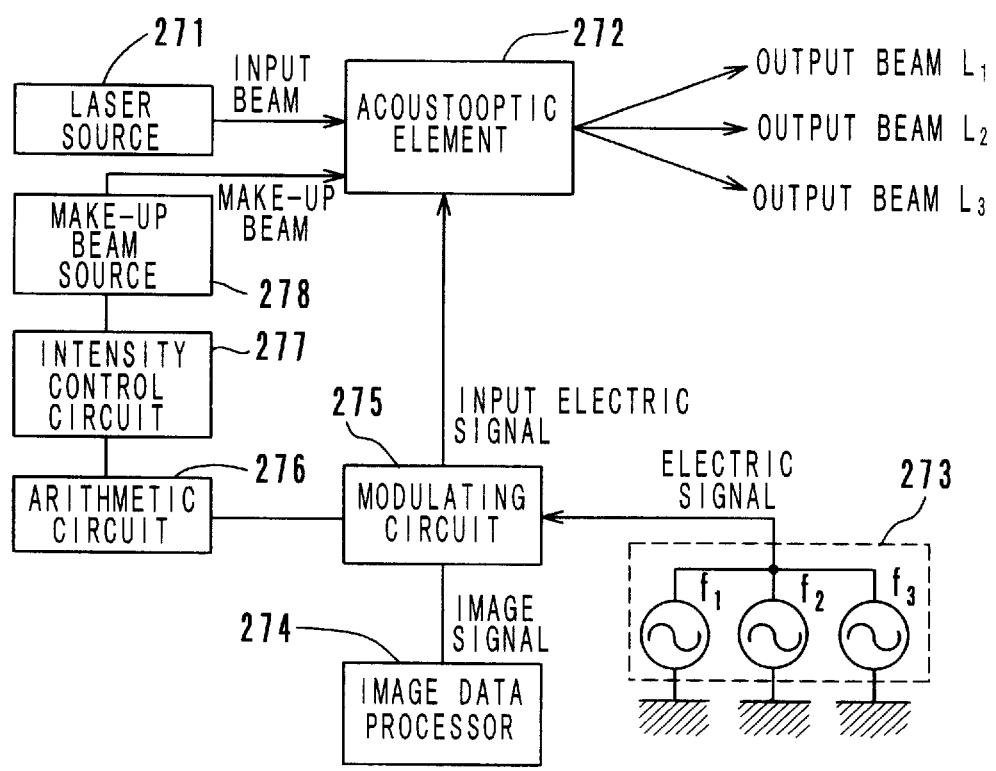
FIG. 23 is a block diagram of another conventional multi-beam emitting device.

With this multi-beam emitting device 161, when an image with a low density is to be formed on a scanning surface, as shown in FIG. 18, the switches S1 and S2 are turned on and off, respectively, so that a laser beam L is deflected at the deflecting position 113 and is split into a plurality of beams. In this case, the intervals among scanning lines on the scanning surface are large. On the other hand, when an image with a high density is to be formed on the scanning surface, as shown in FIG. 19, the switches S1 and S2 are turned off and on, respectively, so that the laser beam L is deflected at the deflecting position 114 and is split into a plurality of beams. In this case, the intervals among scanning lines on the scanning surface are small.

The multi-beam emitting device 161 not only has the same effects as the multi-beam emitting device 151 does but also has a wider range of image density switch because the image density switch can be carried out by a combination of the deflecting position switch between 113 and 114 and the frequency switch between $f_1$ and $f_2$.

FIG. 20 shows an optical waveguide type acoustooptic element which was produced by the inventors to be provided in the multi-beam emitting devices of the first through third embodiments.

On a rectangular ceramic substrate 200, an optical waveguide 201 made of $LiNbO_3$ extends from the left side to the right side. In the center of the optical waveguide 201, an interdigital transducer 202 for exciting surface acoustic waves and an interdigital transducer 203 for absorbing unnecessary surface acoustic waves are provided oppositely. On the ceramic substrate 200, electrodes 205 are provided with the optical waveguide 201 in-between. These electrodes 205 are used as relay electrodes when the interdigital transducers 202 and 203 are electrically connected to an external device (for example, a high-frequency power source).

Other Embodiments

Although in the above embodiments, prisms are used for incidence and emergence of a laser beam to and from an optical waveguide, diffraction gratings can be used instead. Also, an optical waveguide may be so structured that a laser beam can be coupled to an optical waveguide through an end surface and can be emergent therefrom through an opposite end surface.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A multi-beam emitting device comprising:

a light source which emits a light beam;

a beam splitter which drives an acoustooptic element with a plurality of electric signals with different frequencies applied thereto to deflect the light beam emitted from the light source and split the light beam into a plurality of beams;

a signal generator which generates the electric signals with different frequencies which are used for the drive of the acoustooptic element;

a modulating circuit which turns on and off the electric signals generated by the signal generator individually based on a data signal; and an intensity control circuit which controls the light source to emit a light beam with a varied intensity based on a control signal transmitted from the modulating circuit.

2. A multi-beam emitting device as claimed in claim 1, wherein the acoustooptic element is of an optical waveguide type.

3. A multi-beam scanning optical apparatus comprising:

a multi-beam emitting device which emits a plurality of light beams;

a deflector which deflects the light beams emitted from the multi-beam emitting device;

a scanning member which has a scanning surface on which the light beams deflected by the deflector are scanned; and a scanning lens system which focuses the light beams deflected by the deflector on the scanning surface;

wherein the multi-beam emitting device comprises:

a light source which emits a light beam;

a beam splitter which drives an acoustooptic element with a plurality of electric signals with different frequencies applied thereto to deflect the light beam emitted from the light source and split the light beam into a plurality of beams;

a signal generator which generates the electric signals with different frequencies which are used for the drive of the acoustooptic element;

a modulating circuit which turns on and off the electric signals generated by the signal generator individually based on a data signal; and an intensity control circuit which controls the light source to emit a light beam with a varied intensity based on a control signal transmitted from the modulating circuit.

4. A multi-beam scanning optical apparatus as claimed in claim 3, wherein the acoustooptic element is of an optical waveguide type.

5. A multi-beam scanning optical apparatus as claimed in claim 3, wherein the light beams emitted from the multi-beam emitting device are incident to the scanning lens with intervals thereamong enlarged in a sub scanning direction.

6. A multi-beam emitting device comprising:

a light source which emits a light beam;

a beam splitter which deflects the light beam emitted from the light source and splits the light beam into an even number of beams;

a shutting member which shuts out a half of the beams split from the light beam by the beam splitter; and a modulating circuit which controls the beam splitter so that the total quantity of light of the beams which are emergent from the beam splitter and not shut out by the shutting member and the beams which are emergent from the beam splitter and shut out by the shutting member will be constant.

7. A multi-beam emitting device as claimed in claim 6, wherein;

the beam splitter is an optical waveguide type acoustooptic element; and the optical waveguide type acoustooptic element is driven with a plurality of electric signals with different frequencies applied thereto, the number of the electric signals being equal to the number of beams into which the optical waveguide type acoustooptic element is to split the light beam.

8. A multi-beam emitting device as claimed in claim 7, wherien the modulating circuit turns on and off the electric signals applied to the optical waveguide type acoustooptic element individually.

9. A multi-beam emitting device as claimed in claim 7, wherein the modulating circuit controls amplitudes of the electric signals applied to the optical waveguide type acoustooptic element individually.

10. A multi-beam scanning optical apparatus comprising:

a multi-beam emitting device which emits a plurality of light beams;

a deflector which deflects the light beams emitted from the multi-beam emitting device;

a scanning member which has a scanning surface on which the light beams deflected by the deflector are scanned; and a scanning lens system which focuses the light beams deflected by the deflector on the scanning surface;

wherein the multi-beam emitting device comprises:

a light source which emits a light beam;

a beam splitter which deflects the light beam emitted from the light source and splits the light beam into an even number of beams;

a shutting member which shuts out a half of the beams split from the light beam by the beam splitter; and a modulating circuit which controls the beam splitter so that the total quantity of light of the beams which are emergent from the beam splitter and not shut out by the shutting member and the beams which are emergent from the beam splitter and shut out by the shutting member will be constant.

11. A multi-beam scanning optical apparatus as claimed in claim 10, wherein:

the beam splitter of the multi-beam emitting device is an optical waveguide type acoustooptic element; and the optical waveguide type acoustooptic element is driven with a plurality of electric signals with different frequencies applied thereto, the number of the electric signals being equal to the number of beams into which the optical waveguide type acoustooptic element is to split the light beam.

12. A multi-beam scanning optical apparatus as claimed in claim 11, wherein the modulating circuit of the multi-beam emitting device turns on and off the electric signals applied to the optical waveguide type acoustooptic element individually.

13. A multi-beam scanning optical apparatus as claimed in claim 11, wherein the modulating circuit of the multi-beam emitting device controls amplitudes of the electric signals applied to the optical waveguide type acoustooptic element individually.

14. A multi-beam emitting device to be used as a light emitting device in an optical apparatus, the multi-beam emitting device comprising:

a light source which emits a light beam; and an optical waveguide type acoustooptic element which deflects the light beam emitted from the light source and splits the light beam into a plurality of beams;

wherein, a deflecting position of the light beam and a beam waist position of the light beam are inside the optical waveguide type acoustooptic element at a specified distance from each other.

15. A multi-beam emitting device as claimed in claim 14, wherein the optical waveguide type acoustooptic element has a plurality of ultrasonic oscillators which excite surface acoustic waves.

16. A multi-beam emitting device as claimed in claim 14, wherein:

two adjacent beams split from the light beam by the optical waveguide type acoustooptic element fulfill a condition expressed by the following expression (1); and a distance into which the distance between the deflecting position and the beam waist position is converted when it is supposed that an optical path between the deflecting position and the beam waist position is in the air is expressed by the following expression (2):

$$D_m > 4\lambda \cdot C \cdot P_i / \{\pi \cdot (\theta_2 - \theta_1) \cdot D_v\} \quad (1)$$

$$\Delta = \pi \cdot D_0 \cdot (D_m^2 - D_0^2)^{1/2} / 4\lambda \quad (2)$$

$D_m$: a beam diameter at the deflecting position $D_v$: an ultimately desired beam diameter $D_0$: a beam diameter at the beam waist position $P_i$: an ultimately desired interval between the two adjacent beams $\theta_1, \theta_2$: deflecting angles of the two adjacent beams $\Delta$: a distance into which the distance between the deflecting position and the beam waist position is converted when it is supposed that the optical path therebetween is in the air C: a proportional constant of an optical system $\lambda$: a wavelength of the light beam.

17. A multi-beam scanning optical apparatus comprising:

a multi-beam emitting device which emits a plurality of beams;

a deflector which deflects the beams emitted from the multi-beam emitting device;

a scanning member which has a scanning surface on which the beams deflected by the deflector are scanned; and a scanning lens system which focuses the beams deflected by the deflector on the scanning surface;

wherein the multi-beam emitting device comprises:
a light source which emits a light beam; and
an optical waveguide type acoustooptic element which deflects the light beam emitted from the light source and splits the light beam into a plurality of beams;
wherein, a deflecting position of the light beam and a beam waist position of the light beam are inside the optical waveguide type acoustooptic element at a specified distance from each other.

18. A multi-beam scanning optical apparatus as claimed in claim 17, wherein the optical waveguide type acoustooptic element has a plurality of ultrasonic oscillators which excite surface acoustic waves.

19. A multi-beam scanning optical apparatus as claimed in claim 17, wherein:
two adjacent beams split from the light beam by the optical waveguide type acoustooptic element fulfill a condition expressed by the following expression (1); and
a distance into which the distance between the deflecting position and the beam waist position is converted when it is supposed that an optical path between the deflecting position and the beam waist position is in the air is expressed by the following expression (2):

$$D_m > 4\lambda \cdot C \cdot P_i / \{\pi \cdot (\theta_2 - \theta_1) \cdot D_v\} \quad (1)$$

$$\Delta = \pi \cdot D_0 \cdot (D_m^2 - D_0^2)^{1/2} / 4\lambda \quad (2)$$

$D_m$: a beam diameter at the deflecting position
$D_v$: an ultimately desired beam diameter
$D_0$: a beam diameter at the beam waist position
$P_i$: an ultimately desired interval between the two adjacent beams
$\theta_1, \theta_2$: deflecting angles of the two adjacent beams
$\Delta$: a distance into which the distance between the deflecting position and the beam waist position is converted when it is supposed that the optical path therebetween is in the air
C: a proportional constant of an optical system
$\lambda$: is a wavelength of the light beam.

* * * * *